US012728582B2

(12) United States Patent
Price

(10) Patent No.: US 12,728,582 B2
(45) Date of Patent: Sep. 8, 2026

(54) SYSTEMS AND METHODS FOR ROTARY BLOW-FILL-SEAL (BFS) MACHINE MOLD POSITIONING

(71) Applicant: Koska Family Limited, East Sussex (GB)

(72) Inventor: Jeff Price, Windermere, FL (US)

(73) Assignee: Koska Family Limited (GB)

( * ) Notice: Subject to any disclaimer, the term of this patent is extended or adjusted under 35 U.S.C. 154(b) by 62 days.

(21) Appl. No.: 18/772,043

(22) Filed: Jul. 12, 2024

(65) Prior Publication Data

US 2024/0359389 A1 Oct. 31, 2024

Related U.S. Application Data

(63) Continuation of application No. PCT/US2023/010784, filed on Jan. 13, 2023.

(Continued)

(51) Int. Cl.

*B29C 49/04* (2006.01)
*B29C 49/32* (2006.01)

(Continued)

(52) U.S. Cl.

CPC .. *B29C 49/42809* (2022.05); *B29C 49/04102* (2022.05); *B29C 49/32* (2013.01); *B29C 49/42802* (2022.05); *B29C 49/4283* (2022.05); *B29C 49/46* (2013.01); *B29C 49/4817* (2013.01); *B29C 49/78* (2013.01); *B65B 3/003* (2013.01); *B65B 3/022* (2013.01); *B65B 57/145* (2013.01); *B29C 2049/4664* (2013.01); *B29C 2049/4881* (2022.05);

(Continued)

(58) Field of Classification Search

CPC ... B29C 49/04; B29C 49/04102; B29C 49/32; B29C 49/36; B29C 49/42802; B29C 49/42809; B29C 49/4283; B29C 49/4817; B29C 2049/4881; B29C 2049/4887; B29C 2049/5844; B29C 49/76; B29C 49/78; B29C 2049/78805; B29K 2023/06; B29K 2023/12; B65B 3/003; B65B 3/022; B65B 57/145

USPC ............ 264/331.17, 524, 525, 540; 425/524, 425/532, 535; 53/453, 559, 561

See application file for complete search history.

(56) References Cited

U.S. PATENT DOCUMENTS 3,025,562 A 3/1962 Nelson
3,519,705 A 7/1970 Pannenbecker (Continued)

FOREIGN PATENT DOCUMENTS

CN 104441577 A * 3/2015 ............ B29C 49/04
DE 1297525 6/1969

(Continued)

OTHER PUBLICATIONS

Translation of CN 104441577 A (published on Mar. 25, 2015).*

(Continued)

*Primary Examiner* — Leo B Tentoni

(74) *Attorney, Agent, or Firm* — Rowan Tree Law Group, PLLC; Carson C.K. Fincham

(57) ABSTRACT

Systems and methods for rotary Blow-Fill-Seal (BFS) mold positioning that utilize fixed-position filling mandrels and upward moving molds to form mandrel-molded BFS product features utilizing a modified mold positioning path profile.

31 Claims, 15 Drawing Sheets

Related U.S. Application Data

(60) Provisional application No. 63/299,391, filed on Jan. 13, 2022.

(51) Int. Cl.

| | |
|---|---|
| ***B29C 49/36*** | (2006.01) |
| ***B29C 49/42*** | (2006.01) |
| ***B29C 49/46*** | (2006.01) |
| ***B29C 49/48*** | (2006.01) |
| ***B29C 49/76*** | (2006.01) |
| ***B29C 49/78*** | (2006.01) |
| ***B65B 3/00*** | (2006.01) |
| ***B65B 3/02*** | (2006.01) |
| ***B65B 57/14*** | (2006.01) |
| *B29C 49/58* | (2006.01) |
| *B29K 23/00* | (2006.01) |
| *B29L 31/00* | (2006.01) |

(52) U.S. Cl.

CPC ................ *B29C 2049/4887* (2013.01); *B29C 2049/5844* (2013.01); *B29C 2049/78805* (2022.05); *B29K 2023/06* (2013.01); *B29K 2023/12* (2013.01); *B29L 2031/7158* (2013.01)

(56) References Cited

U.S. PATENT DOCUMENTS

| | | | |
|---|---|---|---|
| 5,901,865 | A | 5/1999 | Weiler |
| 6,074,596 | A | 6/2000 | Jacquet |
| 10,940,633 | B2 | 3/2021 | Schubert |
| 2020/0164563 | A1 | 5/2020 | Spallek |

FOREIGN PATENT DOCUMENTS

| | | |
|---|---|---|
| WO | 2018028820 | 2/2018 |
| WO | 2023137167 | 7/2023 |

OTHER PUBLICATIONS

International Search Report for Application PCT/US23/10784 dated Apr. 27, 2023; 3 pps.

International Written Opinion for Application PCT/US23/10784 dated Apr. 27, 2023; 12 pps.

* cited by examiner

SYSTEMS AND METHODS FOR ROTARY BLOW-FILL-SEAL (BFS) MACHINE MOLD POSITIONING

CROSS-REFERENCE TO RELATED APPLICATIONS

This application is a Continuation Application of PCT Application No. PCT/US23/10784 filed on Jan. 13, 2022 and titled SYSTEMS AND METHODS FOR ROTARY BLOW-FILL-SEAL (BFS) MACHINE MOLD POSITIONING, which PCT Application claims benefit of and priority under 35 U.S.C. § 119 (e) to, and is a Non-provisional of, U.S. Provisional Patent Application No. 63/299,391 filed on Jan. 13, 2022 and titled "Systems and Methods for Rotary Blow-Fill-Seal (BFS) Machine Mold Positioning." Each of these Applications is hereby incorporated by reference herein in its entirety and for all purposes.

TECHNICAL FIELD

The present disclosure describes systems and methods for fabricating blow-fill-seal (BFS) products (e.g., vial, container, bottle, and/or assemblies thereof), for example, where a filling mandrel can be used to form a portion of the BFS product in addition to filling the BFS product with one or more fluids. In accordance with some embodiments, a BFS manufacturing system (e.g., machine) may employ mold halves that move toward a stationary filling mandrel during a portion of a molding cycle, which movement can engage the filling mandrel with the molded parison, for example, to form a feature of the BFS product.

BACKGROUND

Blow-Fill-Seal (BFS) manufacturing is an advanced aseptic manufacturing technique first developed in the 1930's which has been utilized to produce various forms of plastic products in the United States since the 1960's. Recently, BFS manufacturing has been utilized to introduce cutting-edge pharmaceutical delivery products such as those offered by ApiJect™ Systems, Inc. of Stamford, CT, which provides many advantages with respect to the standard multi-dose glass vials and separate syringes utilized for medicament storage and delivery. The basic BFS process includes: (1) vertically extruding a plastic resin to form a continuous tube of molten plastic (referred to as a "parison"), (2) engaging the parison with a multi-part primary mold (e.g., to shape desired product receptacles), (3) filling the shaped receptacles with a desired fluid via filling mandrels, (4) engaging the parison with a multi-part secondary mold (e.g., to seal the receptacles), and (5) labeling, inspection, packaging, storage, and/or distribution. There are two distinct types of BFS machines currently in use: (i) shuttle machines (e.g., ASEP-TECH® Blow/Fill/Seal machines such as the Model 640 from Weiler™ Engineering, Inc. of Elgin, IL) and (ii) rotary machines (e.g., a Bottelpack™ bp434 and/or Bottelpack™ bp460 machine from Rommelag Kunststoff-Maschinen Vertriebsgesellschaft mbH of Waiblingen, Germany).

SUMMARY OF VARIOUS EMBODIMENTS

Embodiments of the disclosed subject matter provide rotary blow-fill-seal (BFS) manufacturing systems and methods for operation thereof to form features of a molded product using a vertically-stationary filling mandrel. In some embodiments, one or more filling mandrels in a rotary BFS machine are disposed at a fixed position throughout a molding cycle. In some embodiments, a mold of the rotary BFS machine can move upward (e.g., against the extrusion direction of the parison tube) to engage part of a molded product therein with part of a corresponding filling mandrel to form a feature of the molded product, for example, a connection feature such as a luer connection. In some embodiments, the mold of the rotary BFS machine can then move downward (e.g., with the extrusion direction of the parison tube) to disengage the filling mandrel from the molded product and to allow filling of the molded product with a fluid (e.g., medicament). In some embodiments, the mold of the rotary BFS machine can adopt a modified mold positioning path profile, for example, by moving upward and/or at different vertical velocities, in contrast to the downward vertical motion at a substantially-constant velocity employed for molds in conventional rotary BFS machines.

In one or more embodiments, a rotary BFS manufacturing system can comprise a first mold, a positioning system, at least one filling mandrel, a parison system, and a controller. The first mold can comprise first and second mold halves. The positioning system can be coupled to the first mold. The positioning system can be constructed to move the first and second mold halves along a first direction toward or away from each other and along a second direction substantially perpendicular to the first direction. The at least one filling mandrel can be constructed to fill at least one BFS product molded by the rotary BFS manufacturing system with a fluid. The parison system can be constructed to extrude a parison tube surrounding the at least one filling mandrel. The controller can be operatively coupled to the positioning system, the at least one filling mandrel, and the parison system.

The controller can comprise one or more processors and one or more non-transitory computer readable storage media storing instructions that, when executed by the one or more processors, cause the controller to move, via the positioning system, the first and second mold halves along the first direction toward each other and mold a first portion of the parison tube disposed therebetween to form a first portion of the at least one BFS product. The formed first portion of the at least one BFS product can comprise at least one chamber. The instructions can further cause the controller to move, via the positioning system, the first and second mold halves along the second direction toward the at least one filling mandrel, such that part of the first portion of the parison tube is engaged between the first mold and the at least one filling mandrel so as to form a second portion of the at least one BFS product. The instructions can also cause the controller to move, via the mol positioning system, the first and second mold halves along the second direction away from the at least one filling mandrel, such that the second portion of the at least one BFS product disengages from the at least one filling mandrel and such that a dispensing end of the at least one filling mandrel remains disposed within the at least one BFS product within the first mold. The instructions can further cause the controller to dispense, via the at least one filling mandrel, a fluid from the dispensing end so as to fill the at least one BFS product. Throughout the movement of the first and second mold halves and the fluid dispensing, a position of the dispensing end of the at least one filling mandrel along the second direction can be kept the same.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

The figures depict embodiments for purposes of illustration only. The accompanying figures are not necessarily drawn to scale, emphasis instead being placed upon illustrating the principles disclosed herein. The figures are included to further the understanding of the various aspects and embodiments and are incorporated in and constitute a part of this specification, but are not intended as a definition of the limits of any particular embodiment. In the figures, each identical or nearly identical component that is illustrated in various figures is represented by a like numeral. For purposes of clarity, not every component may be labeled in every figure. One skilled in the art will readily recognize from the following description that alternative embodiments of the examples illustrated herein may be employed without departing from the principles described herein, wherein.

DETAILED DESCRIPTION

I. Introduction

Figure 1:
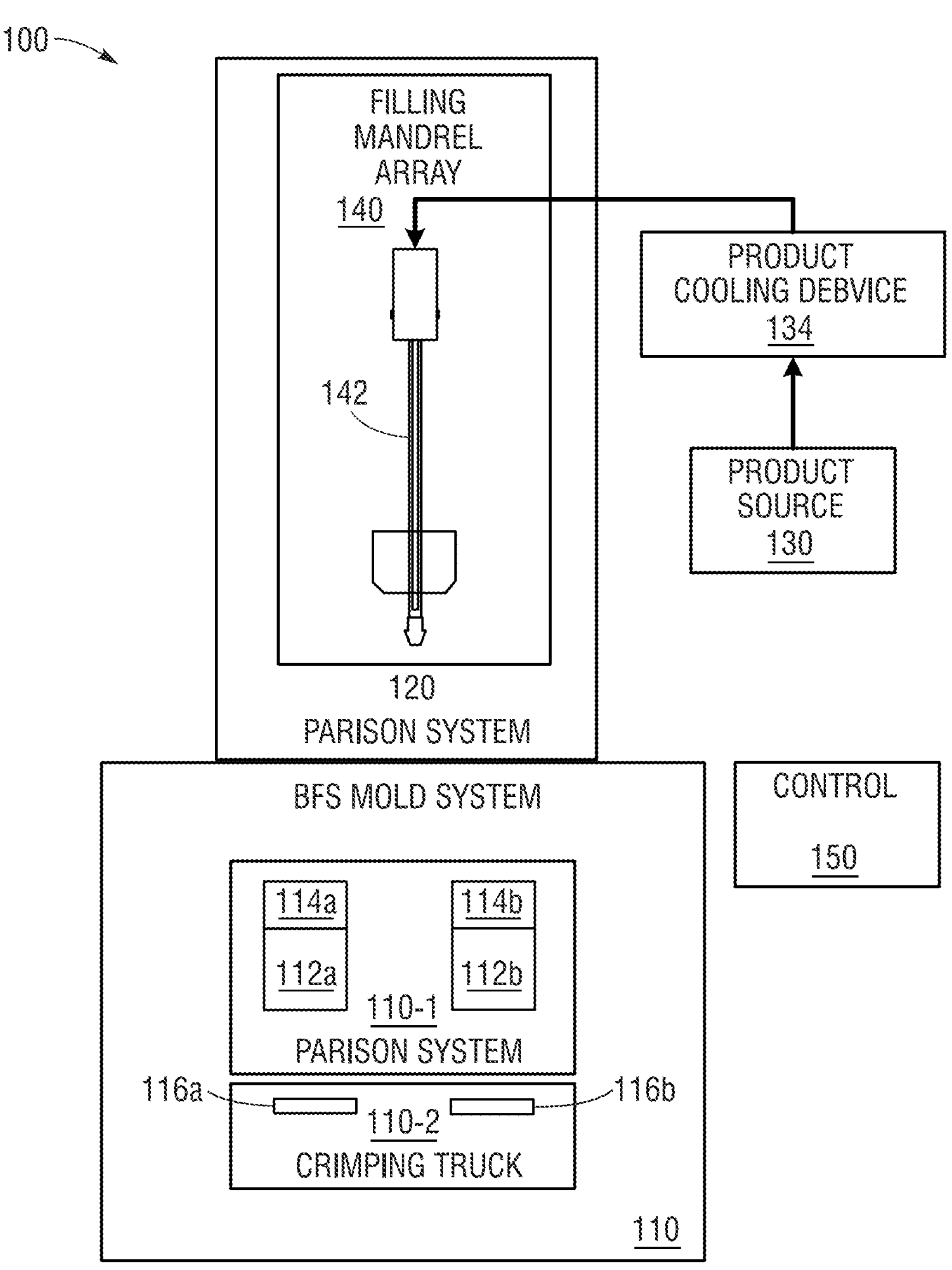
FIG. 1 is a simplified schematic diagram of a blow-fill-seal (BFS) manufacturing system, according to one or more embodiments of the disclosed subject matter.

Embodiments of the disclosed subject matter provide systems and methods for rotary Blow-Fill-Seal (BFS) mold positioning. In some embodiments, the mold cycle and/or mold cycle path of mold components of a rotary BFS machine may be altered from a standard or typical path to provide various advantages. The mold cycle and/or path may be set or altered, for example, such that mold components travel upward to contact a filling mandrel as opposed to the filling mandrel being lowered to contact/meet the mold components.

In typical rotary BFS machines, if an end of a BFS product is desired to be shaped by the filling mandrels, such as to form a particular geometry neck, mating feature, and/or fitting (e.g., a Luer-style fitting), the mandrels must be configured to travel downwards to meet the mold components and/or the product being formed. Mandrel travel requires that the mandrels be outfitted with bearings, bushings, and/or other parts that permit vertical travel of the mandrels. These additional parts require space to install and accordingly reduce the number of mandrels that may be arranged along a given length of the mold. The travel of the mandrels also may result in particle shedding, which may result in contamination of the BFS products.

In accordance with embodiments presented herein, these and other deficiencies are remedied by providing a rotary BFS machine that incorporates a mold travel cycle that positions the molds to engage with fixed mandrels. The fixed mandrels require less separation distance due to fewer necessary parts (e.g., bearings and/or bushings) and a rotary BFS machine in accordance with embodiments herein may accordingly form more units of product (with mandrel-formed portions) per cycle than a typical rotary machine employing traveling mandrels. The utilization of fixed mandrels in embodiments herein further reduces the likelihood of product contamination. Each of these improvements, and others that are apparent from the disclosure herein, provide for rotary BFS machines that are capable of higher throughput and fewer manufacturing errors than typical machines. Higher throughput and reduced errors provide for increased profitability and reliability that advance the art of BFS manufacturing.

Because of the short duration of the molding cycle in rotary BFS machines (e.g., less than 10 seconds) and the unpredictable nature of the extruded parison, it was not apparent that movement of molds toward the stationary mandrels could be used instead of moving the filling mandrels toward the molds to form features of the BFS product. For example, since movement of the molds toward the filling mandrels would be against the extrusion direction of the parison tube, there was a concern that the parison tube could fold over or otherwise sag into contact with the molds, which could compromise the molding process and/or the integrity of the molded product. However, Applicant has unexpectedly found that by controlling the velocities and timing of the vertical motions of the molds, the stationary filling mandrels can successfully be used to form features within molded BFS products, which features are otherwise unattainable in conventional rotary BFS machines with stationary filling mandrels.

II. Rotary BFS Manufacturing Systems

Referring initially to FIG. 1, a block diagram of a rotary BFS manufacturing system 100 according to some embodiments is shown. The term "rotary" with respect to BFS manufacturing and BFS manufacturing machines and processes general refers to BFS machines and processes in which the parison remains continuous (e.g., is not cut) between cycles/product "cards." There are two (2) primary types of rotary BFS machines: (i) carousel machines such as the Bottelpack™ bp460-20 machine from Rommelag Kunststoff-Maschinen Vertriebsgesellschaft mbH of Waiblingen, Germany, which utilize counter-rotating chains of cooperative mold halves and (ii) hybrid machines such as the Bottelpack™ bp434 machine from Rommelag Kunststoff-Maschinen Vertriebsgesellschaft mbH of Waiblingen, Germany, which utilize a single set of cooperative mold halves. In some embodiments, the rotary BFS manufacturing system 100 may comprise either a carousel or hybrid style machine. For ease of illustration herein, the rotary BFS manufacturing system 100 is depicted and described as a hybrid style rotary BFS machine/process.

The rotary BFS manufacturing system 100 may comprise, for example, a rotary BFS mold system 110, a parison system 120, a product cooling device 134, a product source 130, and a controller 150. The controller 150 can be operatively coupled to the BFS mold system 110, the parison system 120, the product cooling device 134, and/or the product source 130 and configured to control operations thereof. The BFS mold system 110 can comprise a mold truck 110-1 and/or a gripping or crimping truck 110-2. The mold truck 110-1 may, for example, be configured and/or coupled to dynamically rearrange corresponding first or primary mold halves 112*a-b* and/or second or secondary mold halves 114*a-b* to form BFS products (not shown in FIG. 1). In some embodiments, each respective primary mold half 112*a-b* may be configured to form a primary portion of a desired BFS product (such as a chamber or fluid reservoir structure; not shown in FIG. 1) and each respective secondary mold half 114*a-b* may be configured to form a secondary portion of the BFS products (such as a seal; not shown in FIG. 1).

According to some embodiments, the rotary BFS manufacturing system 100 and/or the crimping truck 110-2 may be configured and/or coupled to house and/or retain corresponding crimping halves 116*a-b* (e.g., gripping arms or jaws) that may, for example, be selectively engaged to form, crimp, seal, grab, and/or otherwise engage with a product stream (not shown in FIG. 1) such as a parison tube (not shown in FIG. 1) extruded and/or formed by a parison system 120 of the rotary BFS manufacturing system 100. According to some embodiments, the product source 130 comprises a liquid product reservoir that provides fill product (e.g., a fluid, such as a medicament) to product cooling device 134. In some embodiments, the fill product may be provided from the product cooling device 134 to (or through) a filling mandrel array 140. The filling mandrel array 140 may comprise, for example, a plurality of filling needles or mandrels 142 coupled to be automatically engaged with the rotary BFS mold system 110 to fill the formed BFS products before they are sealed. In some embodiments, the filling mandrel array 140 is controlled to dispense a predetermined small volume of fluid into the formed BFS product, for example, a total volume per BFS product in a range of 0.5 mL to 5 mL (e.g., 1 mL or less, such as approximately 0.6 mL).

Fewer or more components 110, 110-1, 110-2, 112*a-b*, 114*a-b*, 116*a-b*, 120, 130, 134, 140, 142, 150 and/or various configurations of the depicted components 110, 110-1, 110-2, 112*a-b*, 114*a-b*, 116*a-b*, 120, 130, 134, 140, 142, 150 may be included in the rotary BFS manufacturing system 100 without deviating from the scope of embodiments described herein. In some embodiments, the components 110, 110-1, 110-2, 112*a-b*, 114*a-b*, 116*a-b*, 120, 130, 134, 140, 142, 150 may be similar in configuration and/or functionality to similarly named and/or numbered components as described herein. For example, in some embodiments, a BFS machine and/or BFS system can further include a mold cooling device coupled to provide cooling (e.g., remove heat from) the BFS machine and/or the mold halves thereof. Alternatively or additionally, in some embodiments, the BFS machine and/or BFS system can include a mandrel cooling device (e.g., for cooling, or at least removing heat from, a filling mandrel array used to fill the fluid in the formed BFS products).

While the BFS manufacturing process is commonly referred to as "Blow-Fill-Seal," for example, BFS product processes may utilize blown air and/or vacuum to engage the parison with the cavities (not separately shown) of the cooperative primary mold halves 112*a-b* and/or the cooperative secondary mold halves 114*a-b*. Thus, in some embodiments, the BFS machine and/or BFS system can include a vacuum device (e.g., a vacuum pump, vacuum tubes, fittings, hoses, and/or connections that are coupled to selectively apply vacuum force to the mold halves or portions thereof, for example, to draw the parison into cavities of the mold) and/or a pressurized air supply (e.g., air pump, air tubes, fittings, hoses, and/or connections that are coupled to selectively apply pressurized to the mold halves or portions thereof). Further details regarding vacuum operation of a rotary BFS machine can be found in International Application No. PCT/US22/21752, filed Mar. 24, 2022 and entitled "Systems and Methods for Rotary Blow-Fill-Seal (BFS) Machine Staged Vacuum," which is incorporated herein by reference. In some embodiments, the rotary BFS manufacturing system 100 (and/or portion thereof) may comprise a hybrid rotary style BFS machine, system, and/or platform programmed and/or otherwise configured to execute (e.g., via a computerized controller device), conduct, and/or facilitate methods described herein such as those in which a mold cycle is defined and/or modified to reposition mold components upward to produce mandrel-formed BFS components (e.g., without requiring mandrel movement).

III. Mold Movement in a Rotary BFS System

Referring to FIGS. 2A-2C and 2F-2K, operation of a rotary BFS system according to some embodiments is shown. In some embodiments, the rotary BFS manufacturing system 200 can be used to simultaneously produce a plurality of BFS products 204 (e.g., an assembly 202, such as a card or cartridge). Each of the BFS products 204 (also referred to herein as a BFS vial, bottle, or container) can be filled with a fluid (such as a medicament) and sealed via an integral seal at the time of manufacture. In some embodiments, the BFS assembly 202 can comprise an array of individual BFS products 204 connected together at adjacent lateral edges thereof. In some embodiments, the BFS assembly 202 may comprise an array of at least five (5) individual BFS products 204, for example, at least twenty-five (25) individual BFS products. Other numbers of individual products in a single BFS assembly are also possible according to one or more contemplated embodiments. Further details regarding configurations and uses of BFS vials can be found in International Publication No. WO 2021/207040, published Oct. 14, 2021 and entitled "Systems and Methods for Pre-Filled Medical Delivery Devices," which is incorporated by reference herein in its entirety. In some embodiments, the assembly 202 of individual products 204 can be simultaneously formed together during a single molding cycle of the rotary BFS manufacturing system.

Figure 2A:
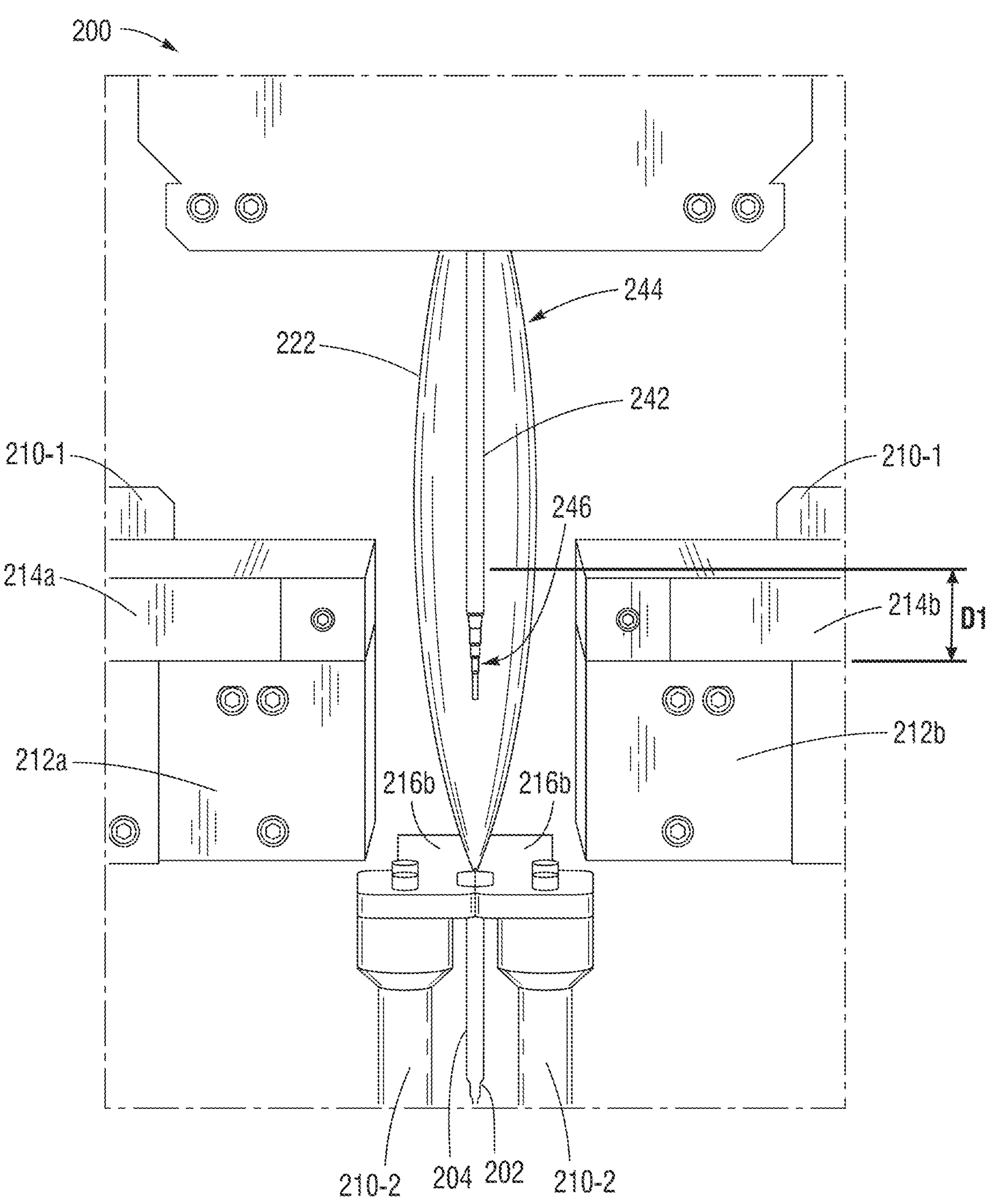
FIG. 2A shows a simplified side view of a rotary BFS manufacturing system during an initial stage of a molding cycle, according to one or more embodiments of the disclosed subject matter.

In the illustrated example of FIG. 2A, the rotary BFS manufacturing system 200 comprises, for example, a mold positioning system 210-1 (e.g., comprising one or more linear actuators, such as a servomechanism) and/or an arm positioning system 210-2 (e.g., comprising one or more linear and/or rotary actuators) that are configured and/or coupled to selectively position (and/or reposition) (i) various cooperative primary mold halves 212*a-b* (e.g., defining primary mold cavities) and/or secondary mold halves 214*a-b* (e.g., defining secondary mold cavities) and/or (ii) various arms 216*a-b* (e.g., holding jaws), respectively. According to some embodiments, the rotary BFS manufacturing system may be configured to extrude and/or define a parison tube 222 inside of which is disposed a stationary mandrel array 244 comprising a filling (and/or forming) mandrel 242. Although a single mandrel 242 is shown in the figures for convenient illustration, in some embodiments, the mandrel array 244 comprises a plurality of filling mandrels 242, for example, twenty-five mandrels.

As depicted in FIG. 2A, for example, the parison 222 may be extruded to hang downward between the cooperatively disposed and/or positioned mold halves 212*a-b*, 214*a-b*, while previously formed products 204 (e.g., filled with sterile fluid) are held beneath the molds 212*a-b*, 214*a-b* by arms 216*a-b*. In some embodiments (also as depicted in FIG. 2A), a top surface of the primary mold halves 212*a-b* may initially be disposed at a first distance "D1" from a datum (e.g., a fixed horizontal reference line) established relative to the fixed vertical positions of the mandrels 242 (e.g., at a first time and/or first point in a movement or positioning cycle of the molds 212*a-b*, 214*a-b*). In some embodiments, the datum can be based on part of the parison system and/or the filling mandrel 242. In some embodiments, this datum may represent and/or coincide with a maximum vertical limit (e.g., a hard stop) of the top surface(s) of the molds 212*a-b*, 214*a-b*.

Figure 2B:
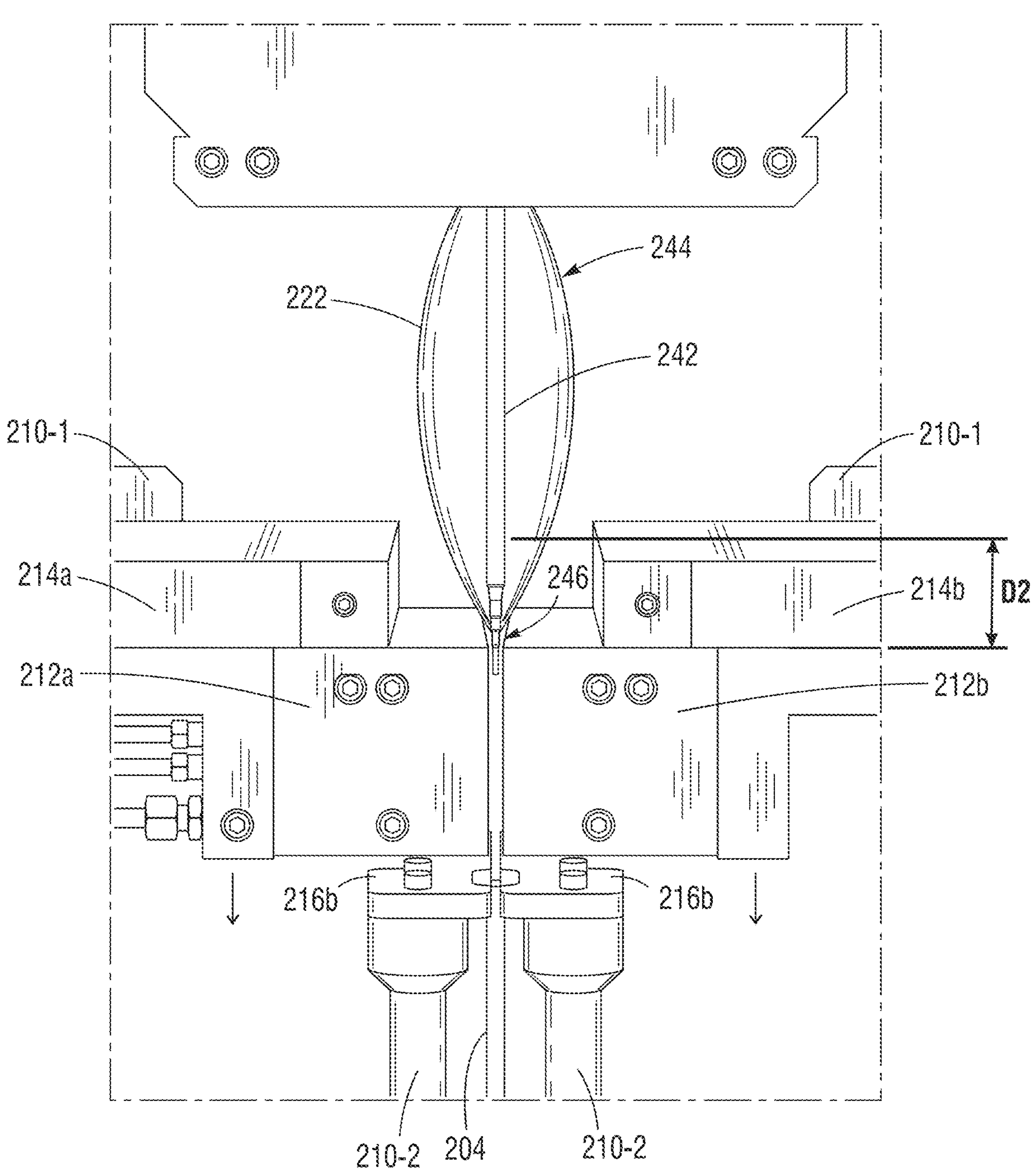
FIG. 2B shows a simplified side view of the rotary BFS manufacturing system during a molding stage of a molding cycle, according to one or more embodiments of the disclosed subject matter.

In some embodiments (e.g., as shown in FIG. 2B), at a second time/cycle point, the primary mold halves 212*a-b* may be closed (e.g., moved horizontally or laterally inward to meet) and/or may be moved vertically (e.g., by the mold positioning system 210-1) to define and/or achieve a second distance "D2" from the datum. In some embodiments, the second distance D2 may be greater than the first distance D1. In some embodiments, during and/or after the second time/cycle point the product 204 may be formed utilizing blown air and/or vacuum to engage the parison 222 with the cavities of the primary molds 212*a-b*. In some embodiments, during and/or after the second time/cycle point, the mandrels 242 (e.g., at least a portion thereof, for example, at least a dispensing end or tip) may be disposed within the respective products 204 of assembly 202 within the primary mold halves 212*a-b*.

Figure 2C:
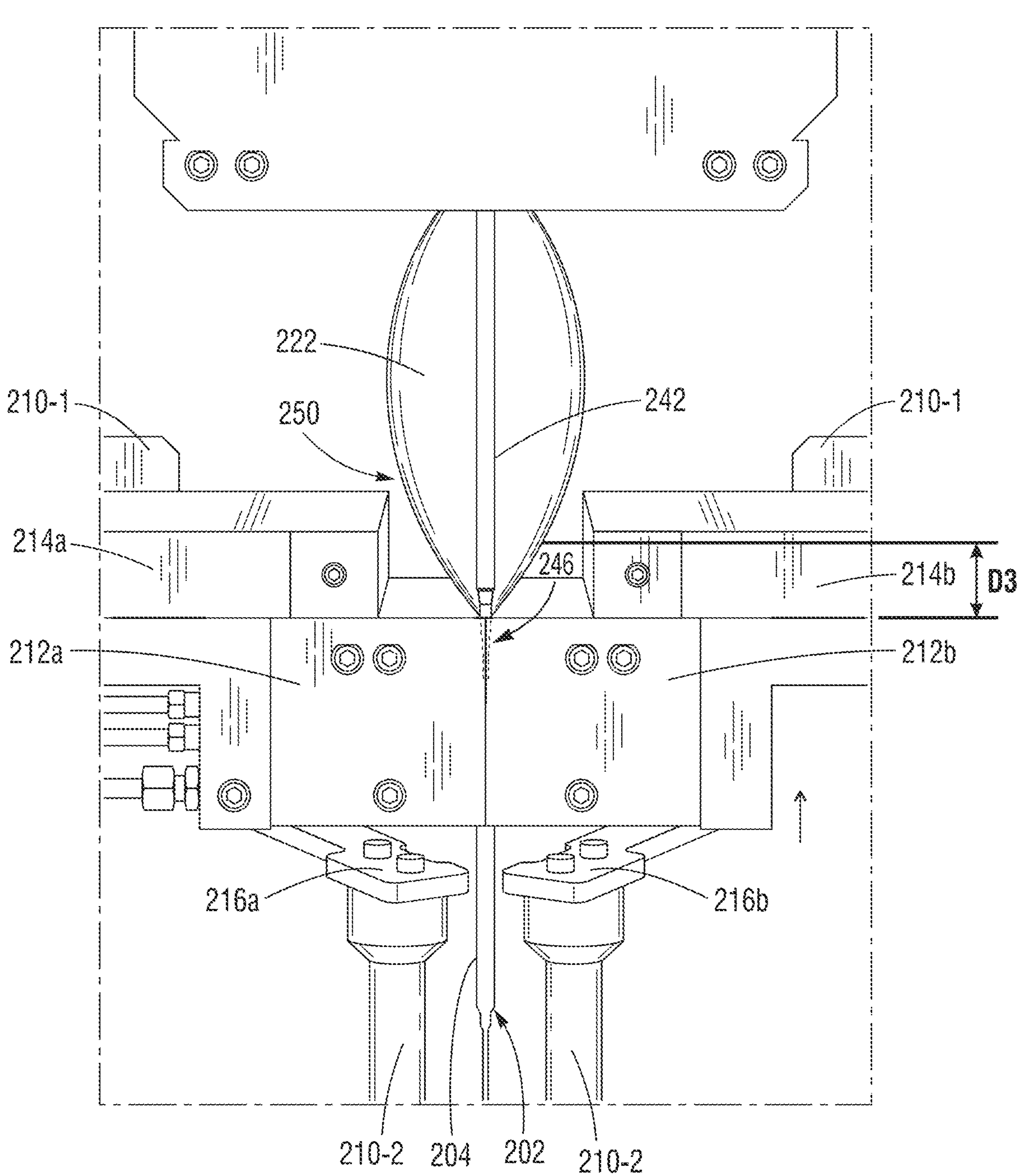
FIG. 2C shows a simplified side view of the rotary BFS manufacturing system during a mandrel engagement stage of a molding cycle, according to one or more embodiments of the disclosed subject matter.

In some embodiments, (e.g., as shown in FIG. 2C), at a third time/cycle point, the primary mold halves 212*a-b* may be moved vertically (e.g., by positioning system 210-1) to define and/or achieve a third distance "D3" from the datum. In some embodiments, the primary mold halves 212*a-b* can be moved upward toward the stationary filling mandrel 242, for example, to contact, during and/or after the third time/cycle point, an engagement portion 246 of the filling mandrel 242 with an upper part of the parison tube 222 contained within the primary mold halves 212*a-b* and/or with an upper portion of the primary mold halves 212*a-b*. For example, in some embodiments, the third distance D3 can be less than the second distance D2 and/or greater than the first distance D1. In some embodiments, during and/or after the third time/cycle point, the parison tube 222 can continue to be extruded downward. With the upward motion of the primary mold halves 212*a-b*, the parison tube 222 may be susceptible to sagging and/or folding over a region 250 into contact with the secondary mold halves 214*a-b*. In some embodiments, the parison extrusion rate, the amount of upward motion to third distance, and/or the time spent at the third distance can be controlled to avoid, or at least reduce, sagging and/or folding over of the parison tube 222.

Figure 2D:
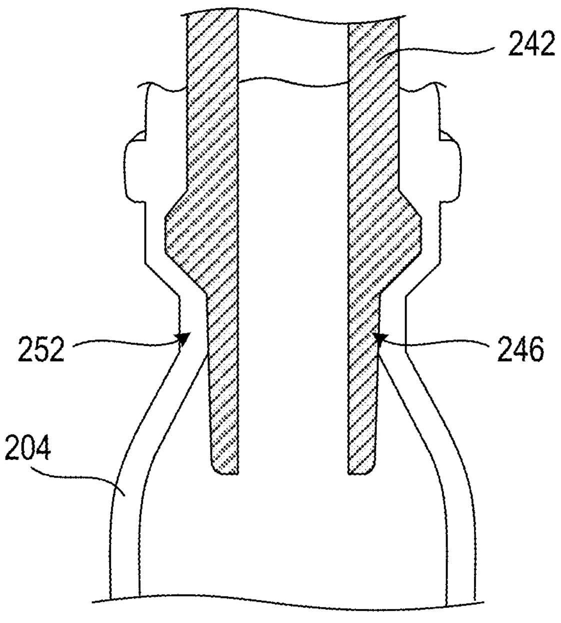
FIG. 2D shows a simplified cross-sectional view of a molded BFS product engaging with the filling mandrel during the mandrel engagement stage, according to one or more embodiments of the disclosed subject matter.
Figure 2E:
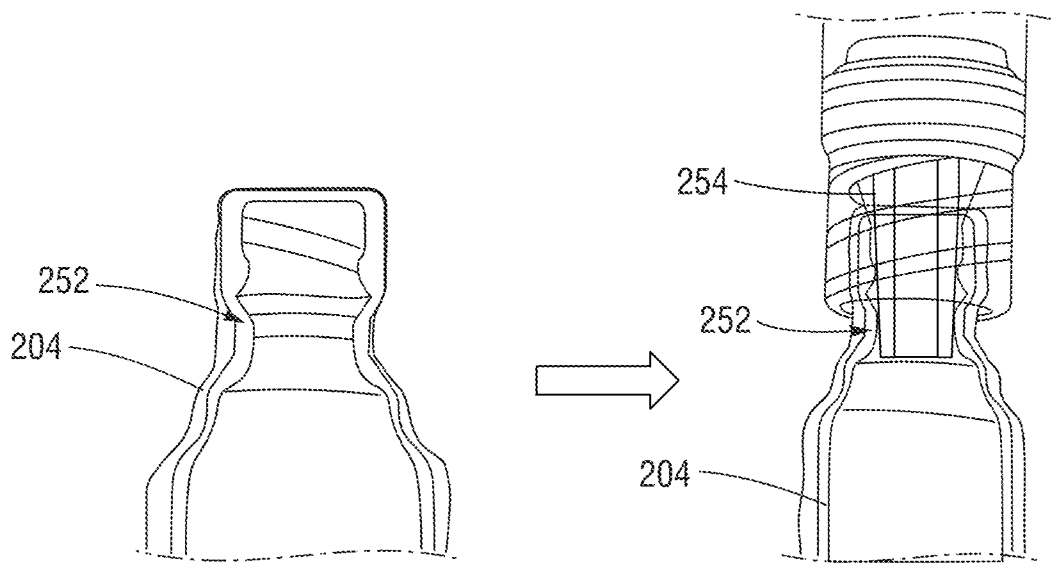
FIG. 2E shows an example of a connection feature formed in a molded BFS product by engagement with the filling mandrel, according to one or more embodiments of the disclosed subject matter.

In some embodiments, the contact with the engagement portion 246 of the stationary filling mandrel 242 can form a feature (e.g., an internal surface feature) at one end of the molded BFS product. In some embodiments, the engagement portion 246 of the stationary filling mandrel 242 can engage with the interior wall of the parison 222 to form a connection feature 252 of the BFS product 204, for example, a taper (e.g., 6°) for a luer-style connection to a syringe 254, such as shown in FIGS. 2D-2E. As used herein, the term "luer connector" or "luer-style connection" refers to a connection collar that is the standard way of attaching syringes, catheters, hubbed needles, intravenous tubes, etc. to each other. In some embodiments, the luer connection can comprise male and female interlocking components that are slightly tapered to hold together via a pressure/twist fit. In some embodiments, a luer connection can optionally include threading that allowing the components to be coupled together more securely. Alternatively or additionally, in some embodiments, engagement with the stationary filling mandrel during and/or after the third time/cycle point can form a non-connection feature of the BFS product 204.

Figure 2F:
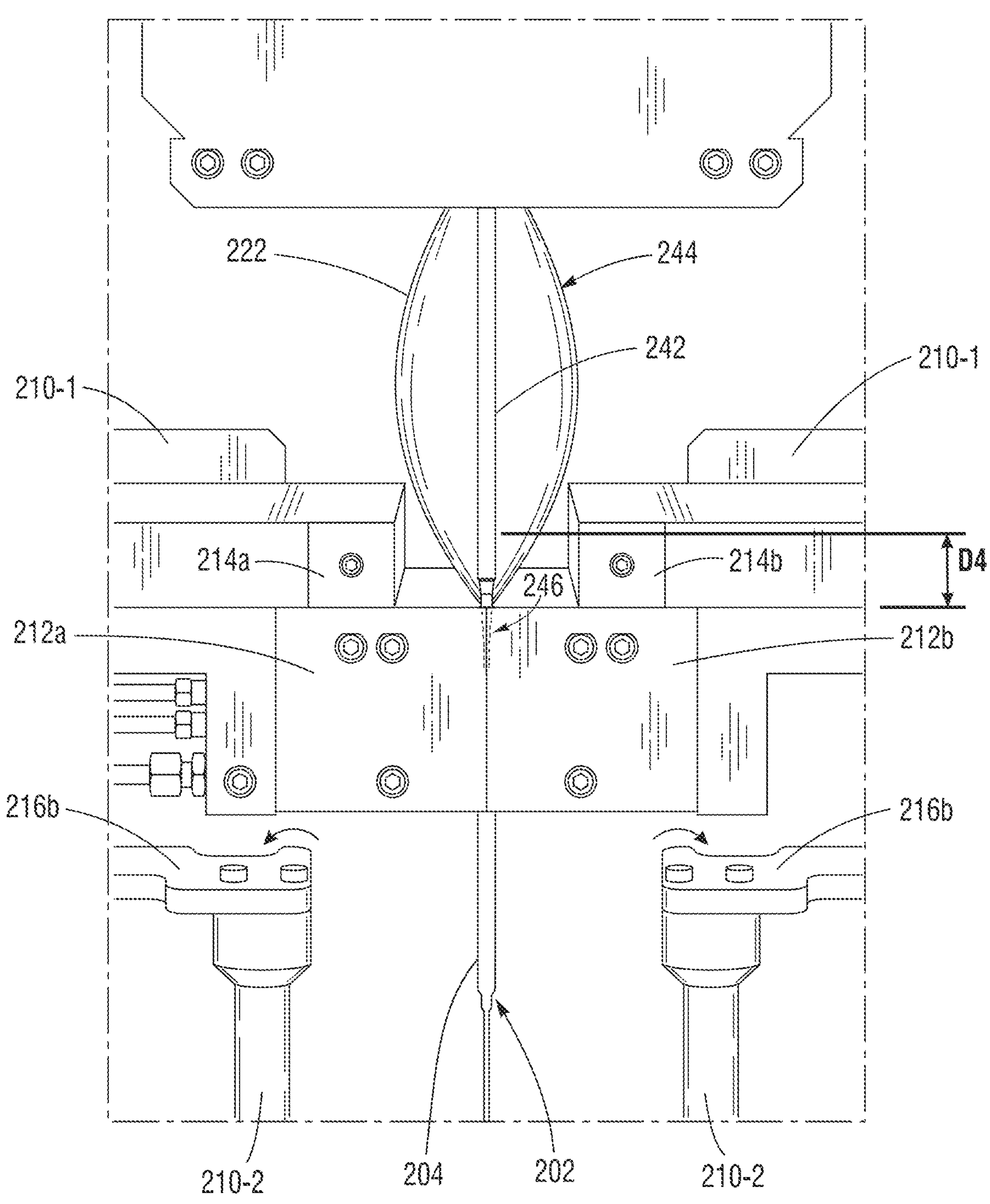
FIGS. 2F-2G shows simplified side views of the rotary BFS manufacturing system during a filling stage of a molding cycle, according to one or more embodiments of the disclosed subject matter.

In some embodiments, (e.g., as shown in FIG. 2F), at a fourth time/cycle point, the primary mold halves 212*a-b* may be moved vertically (e.g., by the mold positioning system 210-1) to define and/or achieve a fourth distance "D4" from the datum. In some embodiments, the primary mold halves 212*a-b* can be moved downward away from the stationary filling mandrel 242, for example, to disengage the engagement portion 246 of the filling mandrel 242 from the parison tube 222. In some embodiments, the fourth distance D4 can be greater than the third distance D3. In some embodiments, the disengagement between the filling mandrel 242 and the parison tube 222 can allow for venting during the subsequent filling process.

In some embodiments, during and/or after the fourth time/cycle point, the filling mandrel 242 can be used to dispense fluid into the molded BFS product (e.g., a chamber or reservoir thereof) within the primary mold halves 212*a-b*. In some embodiments, the fluid dispensed into the BFS product 204 may include any type of agent to be injected into a patient (e.g., human or non-human) and capable of producing an effect (alone, or in combination with an active ingredient). Accordingly, the fluid may include, but is not limited to, a medicament (e.g., a vaccine, a drug, a therapeutic agent, a diluent, an active ingredient, and/or any component of any of the foregoing). During and/or after the fourth time/cycle point, the tips and/or portions of the filling mandrel 242 may be less disposed within the BFS product 204, e.g., due to vertical movement of the primary mold halves 212*a*-*b*, as compared to its position during the third time/cycle point.

Figure 2G:
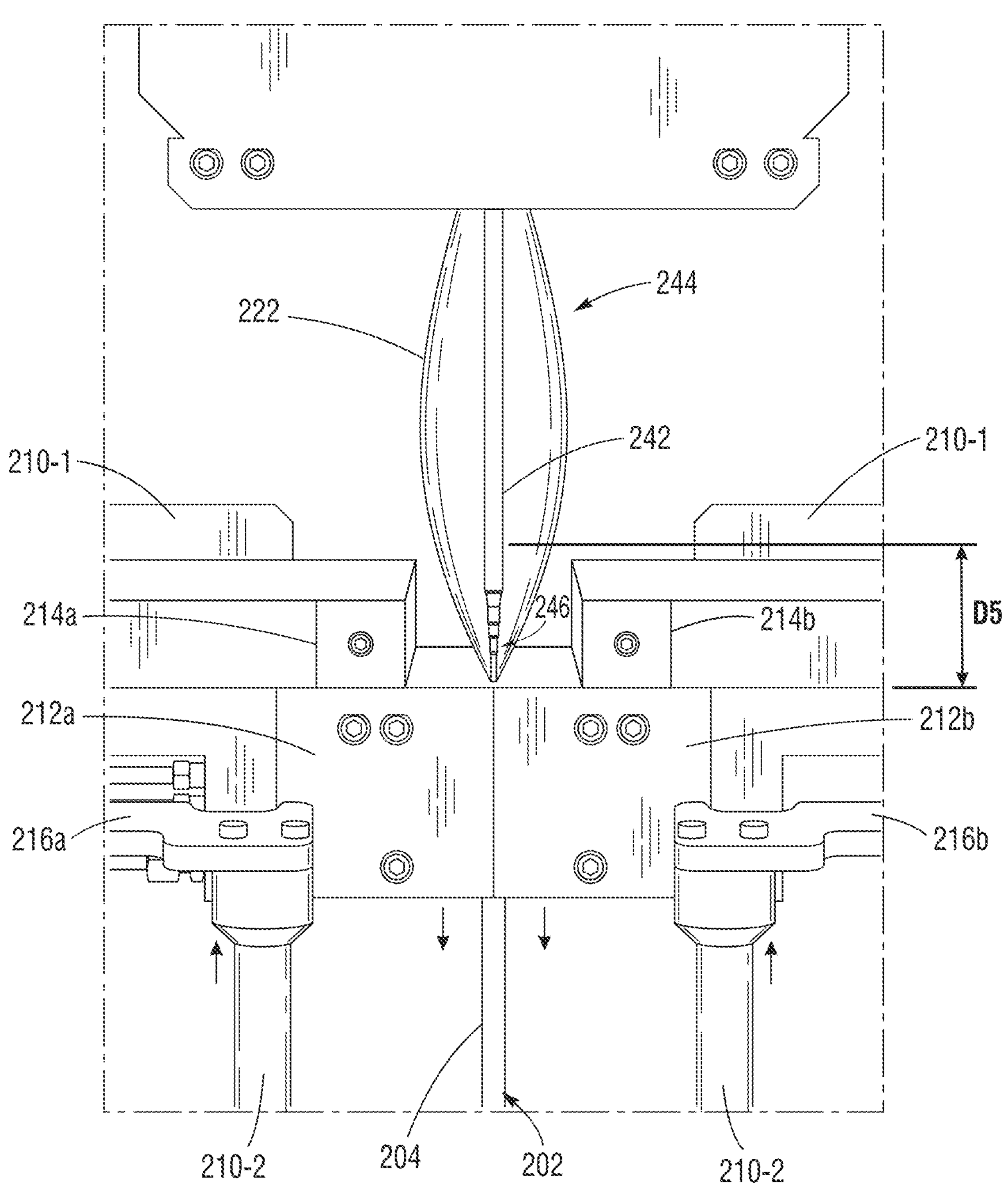

In some embodiments, (e.g., as shown in FIG. 2G), at a fifth time/cycle point, the primary mold halves 212*a*-*b* may be moved vertically (e.g., by the mold positioning system 210-1) to define and/or achieve a fifth distance "D5" from the datum. In some embodiments, the primary mold halves 212*a*-*b* can be moved further downward away from the stationary filling mandrel 242. In some embodiments, the fifth distance D5 can be greater than the fourth distance D4. During and/or after the fifth time/cycle point, the tips and/or portions of the filling mandrel 242 may be even less disposed within the BFS product 204, e.g., due to vertical movement of the primary mold halves 212*a*-*b*, as compared to its position during the fourth time/cycle point. In some embodiments, the dispensing of fluid from the filling mandrel 242 into the molded BFS product may continue during, or at least overlap with, the fourth time/cycle point and/or the fifth time/cycle point.

Figure 2H:
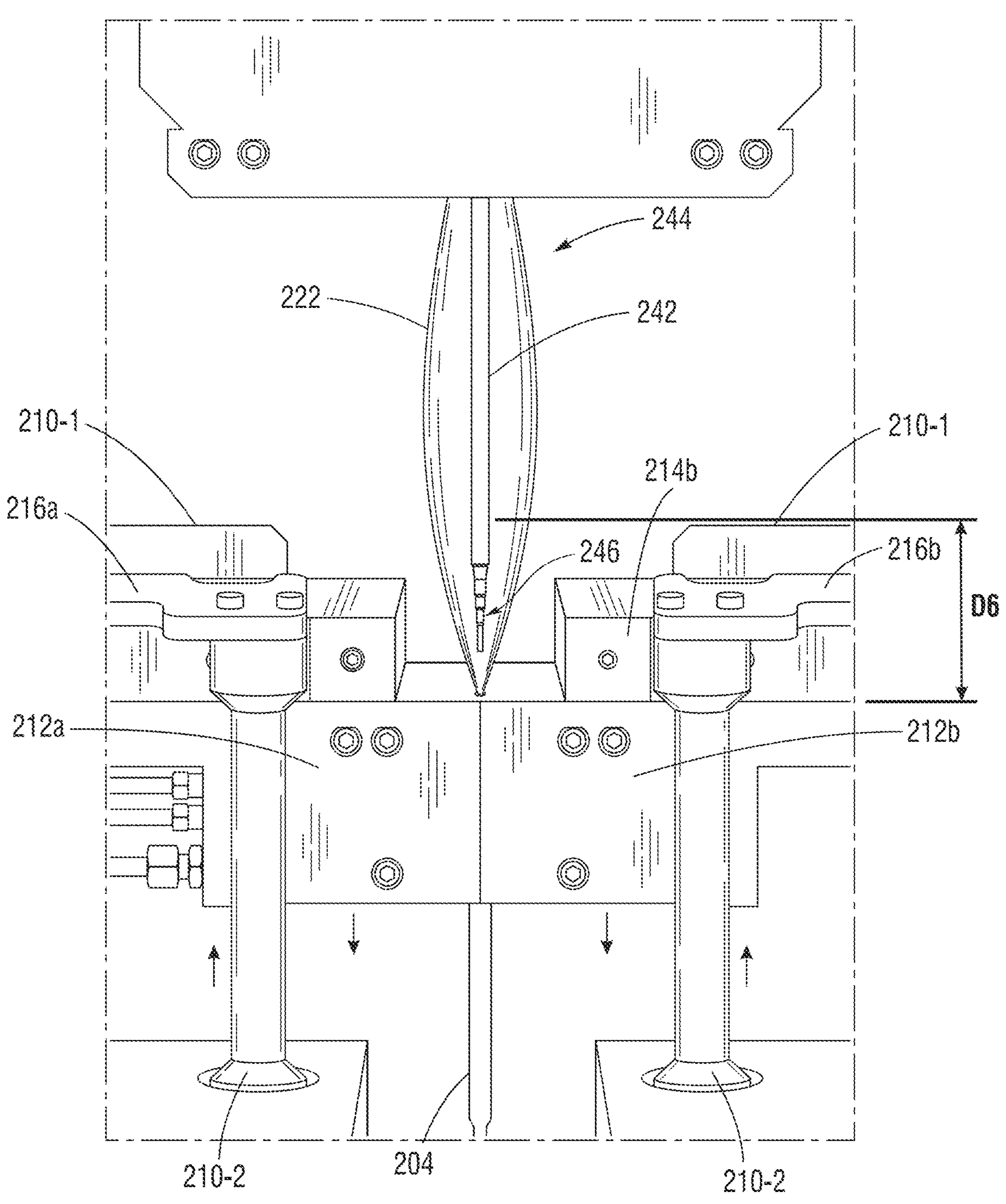
FIGS. 2H-2I show simplified side views of the rotary BFS manufacturing system during a sealing stage of a molding cycle, according to one or more embodiments of the disclosed subject matter.

In some embodiments, (e.g., as shown in FIG. 2H), at a sixth time/cycle point, the primary mold halves 212*a*-*b* may be moved vertically (e.g., by the mold positioning system 210-1) to define and/or achieve a sixth distance "D6" from the datum. In some embodiments, the primary mold halves 212*a*-*b* can be moved further downward away from the stationary filling mandrel 242. In some embodiments, the sixth distance D6 can be greater than the fifth distance D5. In some embodiments, during and/or after sixth time/cycle point, the filling mandrel 242 may have become disposed external to the BFS product 204 contained within the primary mold halves 212*a*-212*b*, for example, because the primary mold halves 212*a*-*b* in which the products 204 are disposed are moved downward to cause the mandrels 242 to exit the products 204. In some embodiments, the dispensing of fluid from the filling mandrel 242 into the molded BFS product may cease during or prior to the sixth time/cycle point. During, overlapping with, or after the sixth time/cycle point, the arms 216*a*-*b* may be moved (e.g., by the arm positioning system 210-2) upwards, so as to positioned/repositioned above and/or adjacent to the top surface of the secondary mold halves 214*a*-*b*, for example, as shown in FIG. 2H.

Figure 2I:
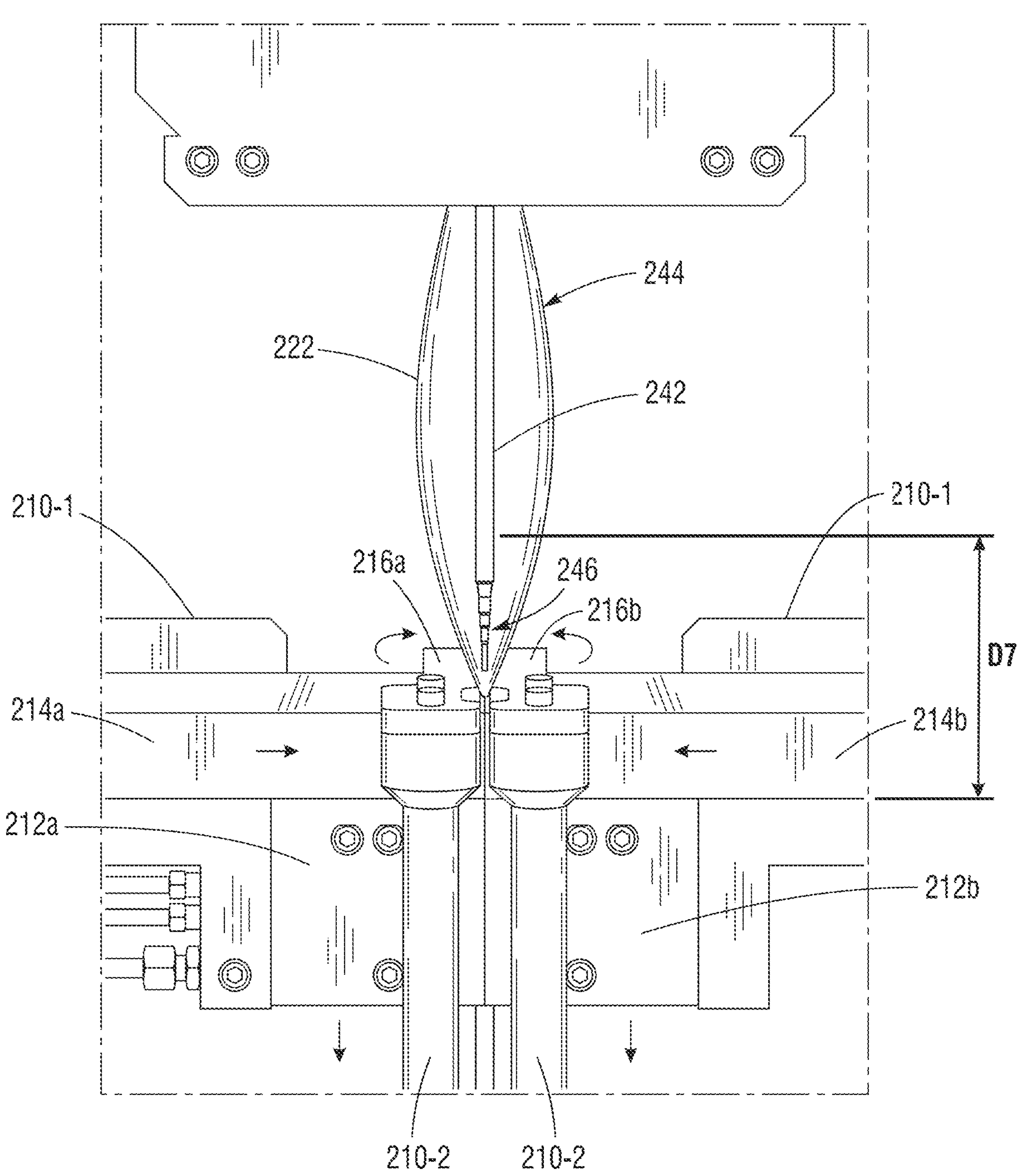

In some embodiments, (e.g., as shown in FIG. 2I), at a seventh time/cycle point, the primary mold halves 212*a*-*b* may be moved vertically (e.g., by the mold positioning system 210-1) to define and/or achieve a seventh distance "D7" from the datum. In some embodiments, the primary mold halves 212*a*-*b* can be moved further downward away from the stationary filling mandrel 242. In some embodiments, the seventh distance D7 can be greater than the sixth distance D6. In some embodiments, prior to or during the seventh time/cycle point, the mandrels 242 may have become disposed far enough away from the primary mold halves 212*a*-*b* to clear the tops of the secondary mold halves 214*a*-*b*. Accordingly, prior to or during the seventh time/cycle point, in some embodiments, the secondary mold halves 214*a*-*b* may be closed (e.g., moved horizontally or laterally inward to meet, for example, by mold positioning system 210-1), as shown in FIG. 2I. In some embodiments, the closing of the secondary mold halves 214*a*-*b* can form a seal that seals the fluid within the individual BFS products 204 (e.g., all in an aseptic environment commensurate with standard BFS aseptic manufacturing). During, overlapping with, or after the seventh time/cycle point, the arms 216*a*-*b* may be closed (e.g., moved horizontally or rotated laterally inward to meet, for example, by the arm positioning system 210-2). In some embodiments, the closing of the arms 216*a*-*b* may, for example, form a crimp and/or other separation between "cards"/cycles of the product 204. Alternatively or additionally, in some embodiments, the closing of the arms 216*a*-*b* can provide an alignment surface upon which the primary mold halves 212*a*-*b* and/or the secondary mold halves 214*a*-*b* can be positioned/repositioned in preparation for a next molding cycle.

Figure 2J:
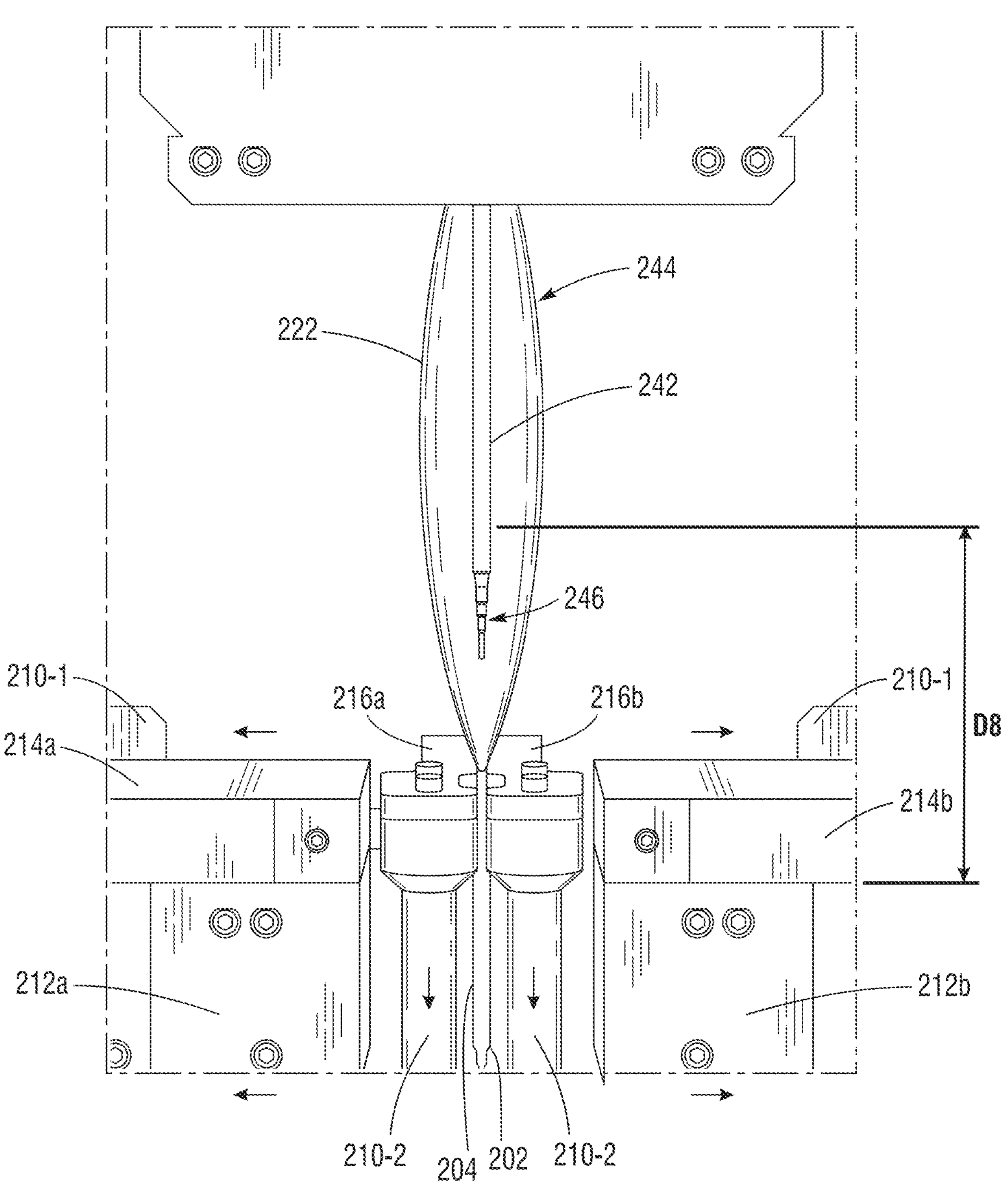
FIGS. 2J-2K show simplified side views of the rotary BFS manufacturing system at the end of a molding cycle, according to one or more embodiments of the disclosed subject matter.

In some embodiments, (e.g., as shown in FIG. 2J), at an eighth time/cycle point, the primary mold halves 212*a*-*b* may be moved vertically (e.g., by the mold positioning system 210-1) to define and/or achieve an eighth distance "D8" from the datum. In some embodiments, the primary mold halves 212*a*-*b* can be moved further downward way from the stationary filling mandrel 242. In some embodiments, the eighth distance D8 can be greater than the seventh distance D7. In some embodiments, prior to or during the eighth time/cycle point, the primary mold halves 212*a*-*b* can open (e.g., moved horizontally away from each other or laterally outward, for example, by the mold positioning system 210-1) and/or the secondary mold halves 214*a*-*b* can open (e.g., moved horizontally away from each other or laterally outward, for example, by the mold positioning system 210-1), thereby forming a vertical gap with the parison tube 222 extending therethrough, as shown in FIG. 2J. In some embodiments, during or after the eighth time/cycle point, the arms 216*a*-*b* may be moved vertically downward (e.g., by the arm positioning system 210-2) through the gap formed by the open mold halves, as shown in FIG. 2J. For example, the arms 216*a*-*b* can move downward with the BFS product 204 as the parison tube 222 continues to be extruded and moves downward.

Figure 2K:
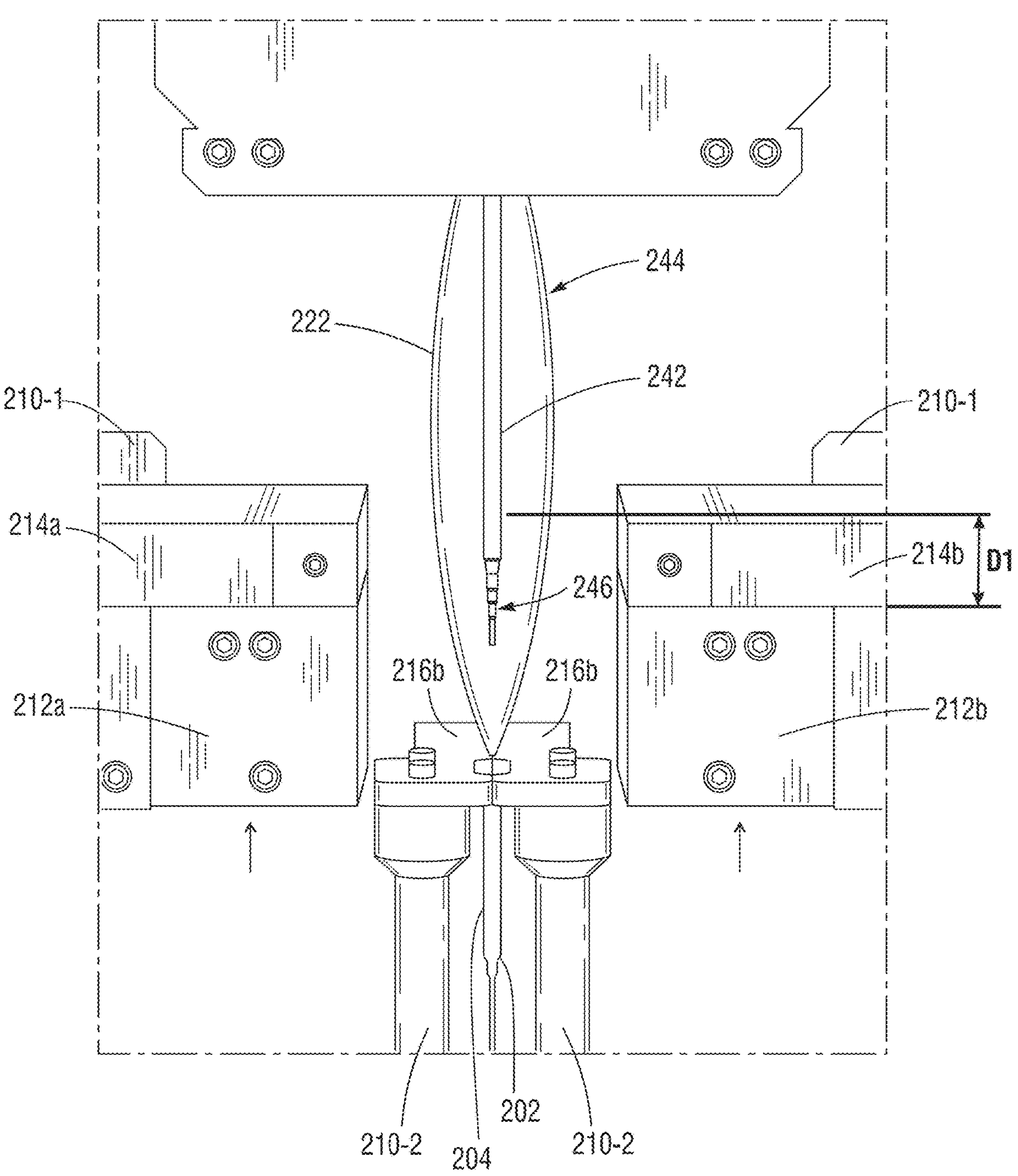

In some embodiments, after the eighth time/cycle point, the primary mold halves 212*a*-*b* may be moved vertically upward (e.g., by the mold positioning system 210-1) to reset for a new molding cycle (e.g., to define and/or re-achieve the first distance D1 from the datum), for example, as shown in FIG. 2K. Thus, in some embodiments, the first distance D1 can be less than the eighth distance D8. In some embodiments, after the eighth time/cycle point, the arms 216*a*-*b* can continue to move downward with the BFS product 204, such that the arms 216*a* are below a bottom surface of the primary mold halves 212*a*-*b*, for example, as shown in FIGS. 2A and 2K.

In accordance with some embodiments of the disclosed subject matter, the various distances from the datum (and/or other relative measurements between the molds 212*a*-*b*, 214*a*-*b*, arms 216*a*-*b*, and/or mandrels 242) at different points in the molding cycle (e.g., at different times) may be selectively set and/or defined (e.g., altered from typical values) to cause the positioning of the molds 212*a*-*b*, 214*a*-*b* to engage with the mandrels 242 to form portions of the products 204. The closing of the primary molds 212*a*-*b* at a certain distance from the datum may cause a portion of the mandrels 242 to function as a mold surface to form a portion of the product 204 (e.g., the molds 212*a*-*b*, 214*a*-*b* may close around the mandrels 242), for example, and/or an upward movement and/or positioning of the molds 212*a*-*b*, 214*a*-*b* may cause the mandrels 242 (e.g., portions thereof) to engage with product being formed in the closed molds.

Fewer or more components 202, 204, 210-1, 210-2, 212*a*-*b*, 214*a*-*b*, 216*a*-*b*, 222, 242, 244, 246, 250, 252, and 254 and/or various configurations of the depicted components 202, 204, 210-1, 210-2, 212*a-b*, 214*a-b*, 216*a-b*, 222, 242, 244, 246, 250, 252, and 254 may be included in a rotary BFS manufacturing system without deviating from the scope of embodiments described herein. In some embodiments, the components 202, 204, 206, 210, 210-1, 210-2, 212*a-b*, 214*a-b*, 216*a-b*, 222, 242, 244, 246, 250, 252, and 254 may be similar in configuration and/or functionality to similarly named and/or numbered components as described herein.

In some embodiments, a rotary BFS manufacturing system (and/or portion thereof) may comprise a hybrid rotary style BFS machine, system, and/or platform programmed and/or otherwise configured to execute, conduct, and/or facilitate methods described herein such as those in which a mold cycle is defined and/or modified to reposition mold components upward to produce mandrel-formed BFS components (e.g., without requiring mandrel movement or otherwise having a mandrel incapable of at least vertical movement (e.g., along a direction of extrusion of the parison)). Alternatively, the rotary style BFS manufacturing system (and/or portion thereof) may comprise a plurality of mold halves on a rotating carousel, with respective pairs constructed to move upward after initial product molding (e.g., by inclusion of an appropriate servomechanism for each mold pair) and/or prior to filling, for example, to allow formation of a part of the BFS product by engaging with a stationary filling mandrel.

IV. Rotary BFS Mold Cycles

Figure 3A:
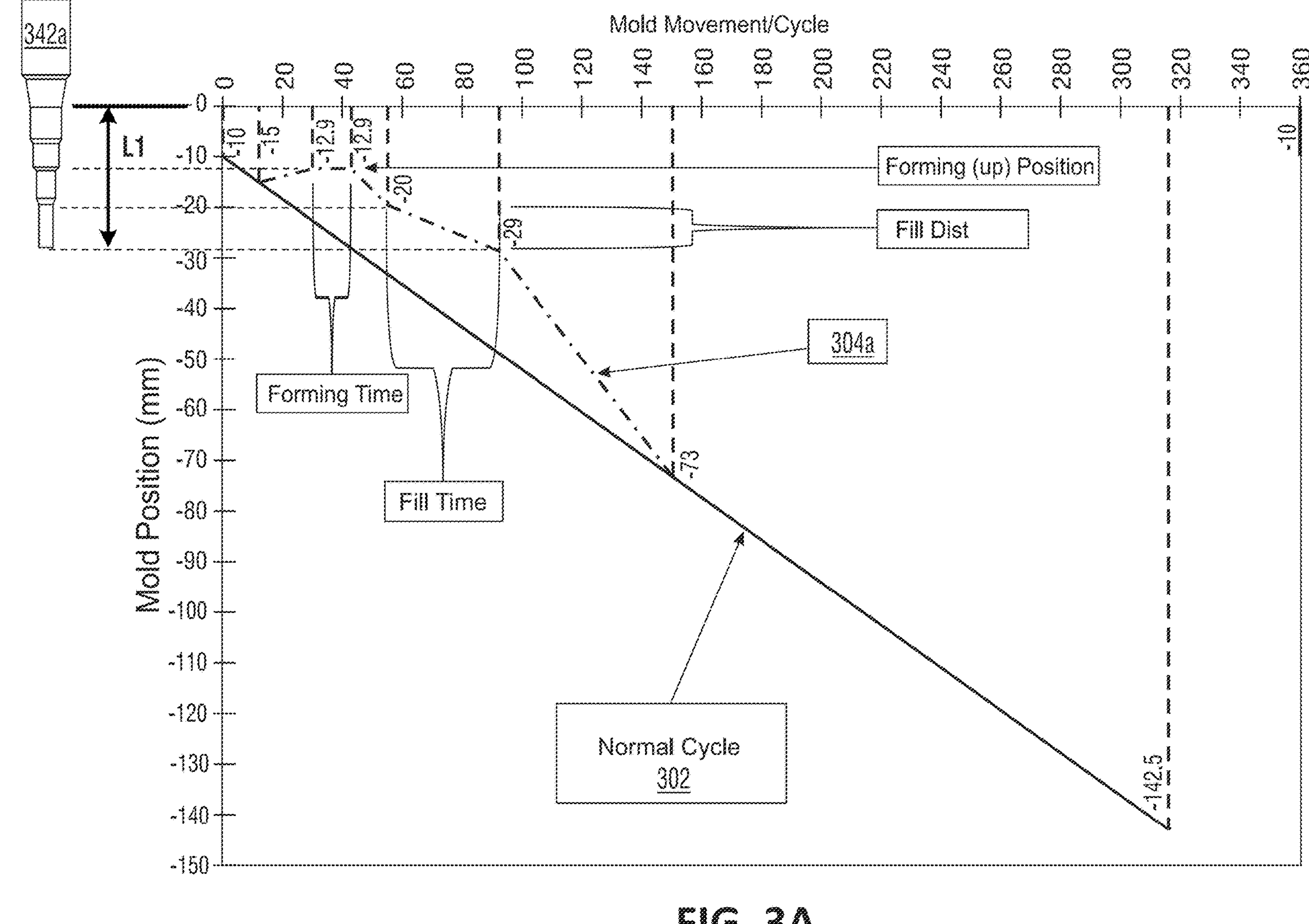
FIG. 3A is a graph illustrating mold movement in a rotary BFS manufacturing system during a complete molding cycle, according to one or more embodiments of the disclosed subject matter.
Figure 3B:
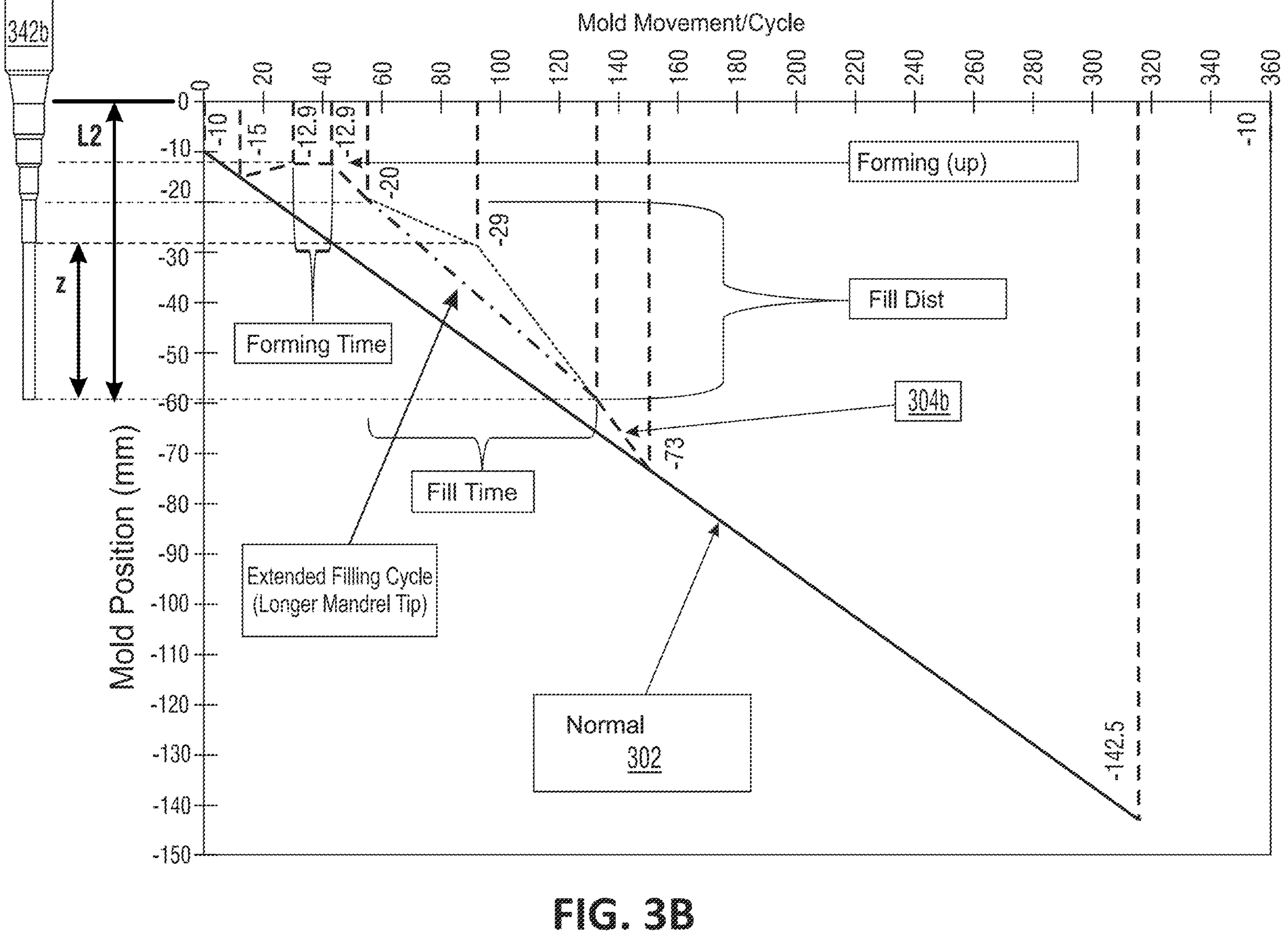
FIG. 3B is another graph illustrating an alternative mold movement in a rotary BFS manufacturing system during a complete molding cycle, according to one or more embodiments of the disclosed subject matter.

Referring to FIGS. 3A-3B, example rotary mold positioning cycles for a rotary BFS manufacturing system according to some embodiments are shown. In both FIG. 3A and FIG. 3B, the graphs comprise an x-axis showing points in a complete molding cycle represented in degrees from zero (0°) to three hundred and sixty (360°) and an inverted y-axis showing distances from a datum of zero (0) to a top surface of a mold (itself not shown) in negative or downward (e.g., vertical) millimeters. Each graph also comprises a depicted or plotting of a normal mold positioning path 302 for a hybrid rotary BFS machine, such as the Bottelpack™ bp434 machine from Rommelag Kunststoff-Maschinen Vertriebsgesellschaft mbH of Waiblingen, Germany. The standard cycle for such a machine is eight seconds (8 s) long, which may equate the cycle degrees to approximately twenty-two hundredths of a second (0.22 s) per ten degrees (10-degrees) of the cycle.

As shown with respect to the positioning of the upper mold surface in the normal mold positioning path 302, the mold can begin at negative ten millimeters (−10 mm) at the start of the cycle and progresses downward in a linear (e.g., uniform velocity) fashion until it reaches a lower vertical apex of negative one hundred and forty-two and one half millimeters (−142.5 mm) at three hundred and fifteen degrees (315-degrees; or about seven seconds (7 s) and then it travels upward (at a higher rate of speed) until it resets at negative ten millimeters (−10 mm) at the end of the cycle (e.g., 360-degrees; eight seconds (8 s).

In some embodiments, a first modified mold positioning path 304*a* may provide a deviation from the normal mold positioning path 302 between approximately ten degrees (10-degrees) and one hundred and fifty degrees (150-degrees) to provide various advantages such as those described herein. In the normal mold positioning path 302, and as depicted in the graph of FIG. 3A with respect to a representation of a first fixed mandrel 342*a* having a first length "L1" (e.g., L1 less than 30 mm, for example, about 29 mm), the first mandrel 342*a* remains within the mold (e.g., at or below the top surface of the mold) from approximately zero degrees (0-degrees) to approximately forty-five degrees (45-degrees), which permits approximately forty-five degrees (45-degrees) or one second (1 s) of fill time—for it is not desirable to dispense fluid product once the first mandrel 342*a* exits the mold. With the first modified mold positioning path 304*a*, the first mandrel 342*a* may remain in the mold until approximately ninety degrees (90-degrees), which permits an additional forty-five degrees (45-degrees) or one second (1 s) of fill time. In some embodiments, this additional fill time may be advantageous to permit higher volumes of fluid product to be filled and/or to permit a slower rate of filling (e.g., which may reduce fluid product heating by permitting it to flow at lower velocities). In some embodiments, the volume of fluid dispensed may be relatively small, for example, in a range of 0.5 mL to 5 mL, inclusive, in total to each BFS product.

According to some embodiments, some of the additional fill time due to the first modified mold positioning path 304*a* may be utilized to form mandrel-molded features on the BFS product. In some embodiments, the first modified mold positioning path 304*a* may cause the mold to move upward (e.g., between approximately twelve degrees (12-degrees) and approximately thirty degrees (30-degrees) to engage with the first mandrel 342*a*. As depicted, the first modified mold positioning path 304*a* may cause the mold and the first mandrel 342*a* to be engaged to form a desired feature (e.g., a Luer-style connector) at approximately negative twelve and nine tenths millimeters (−12.9 mm) and between approximately thirty degrees (30-degrees) and forty-three degrees (43-degrees). In some embodiments, the upward motion of the mold toward the first mandrel 342*a* to provide engagement with the first mandrel 342*a* can be less than 2.5% of a maximum vertical travel distance of the mold. For example, the upward motion of the mold can be less than or equal to 3 mm (e.g., about 2.1 mm), and/or the maximum vertical travel distance of the mold can be less than or equal to 140 mm (e.g., about 132.5 mm). In some embodiments, the engagement between the mold and the first mandrel 342*a* may be maintained for a duration, for example, by keeping the mold and the first mandrel 342*a* stationary with respect to each other. For example, the duration of the engagement may be less than or equal to 5% of a duration of the entire molding cycle (e.g., 360-degrees and/or 3-8 seconds), such as in a range of about 0.2 seconds to 0.5 seconds, inclusive (e.g., about 0.3 seconds).

According to some embodiments, the cycle in accordance with the first modified mold positioning path 304*a* may permit the product to be filled after feature formation and the mold may be moved downward until it rejoins with the normal mold positioning path 302 at approximately one hundred and fifty degrees (150-degrees), e.g., at approximately negative seventy-three millimeters (−73 mm). For example, in some embodiments, a duration of the fill time for the first modified mold positioning path 304*a* may be less than or equal to 12.5% of a duration of the entire molding cycle (e.g., 360-degrees and/or 3-8 seconds), such as less than or equal to about 1 second. In some embodiments, the first modified mold positioning path 304*a* may be defined to maintain the normal mold positioning path 302 between one hundred and fifty degrees (150-degrees) and the end of the cycle.

As depicted in FIG. 3A, in order to deviate from the normal mold positioning path 302 to permit upward mold engagement with the first mandrel 342*a* and/or to provide additional feature formation and/or fill time, the downward velocity of the mold must be increased (e.g., from approximately ninety degrees (90-degrees) until the rejoining at one hundred and fifty degrees (150-degrees). In some embodiments, this increase in velocity and/or the velocity profile may not be desirable. According to some embodiments, such as depicted in FIG. 3B, a second modified mold positioning path 304*b* may be provided to decrease the necessary rejoin speed and/or to smooth out the velocity profile.

For example, in some embodiments, a second mandrel 342*b* may be provided that has a second length "L2" that is longer than the first length "L1" of the first mandrel 342*a* by a difference "z". The difference "z" may, for example, permit the second mandrel 342*b* to stay within the mold longer, thereby permitting a longer filling time and/or reducing the speed at which the mold must achieve to accomplish the rejoining of the normal mold positioning path 302. In some embodiments, the difference "z" may be approximately thirty-one millimeters (31 mm) (e.g., L2 in a range of 40-65 mm, inclusive, for example, about 60 mm). For example, in some embodiments a duration of the fill time for the second mold positioning path 304*b* may be greater than or equal to 20% of a duration of the entire molding cycle (e.g., 360-degrees and/or 3-8 seconds), such as greater than or equal to about 1.5 seconds. In some embodiments, the second modified mold positioning path 304*b* may be defined to maintain the normal mold positioning path 302 between one hundred and fifty degrees (150-degrees) and the end of the cycle.

V. Operating Methods for a BFS Manufacturing System

Figure 4A:
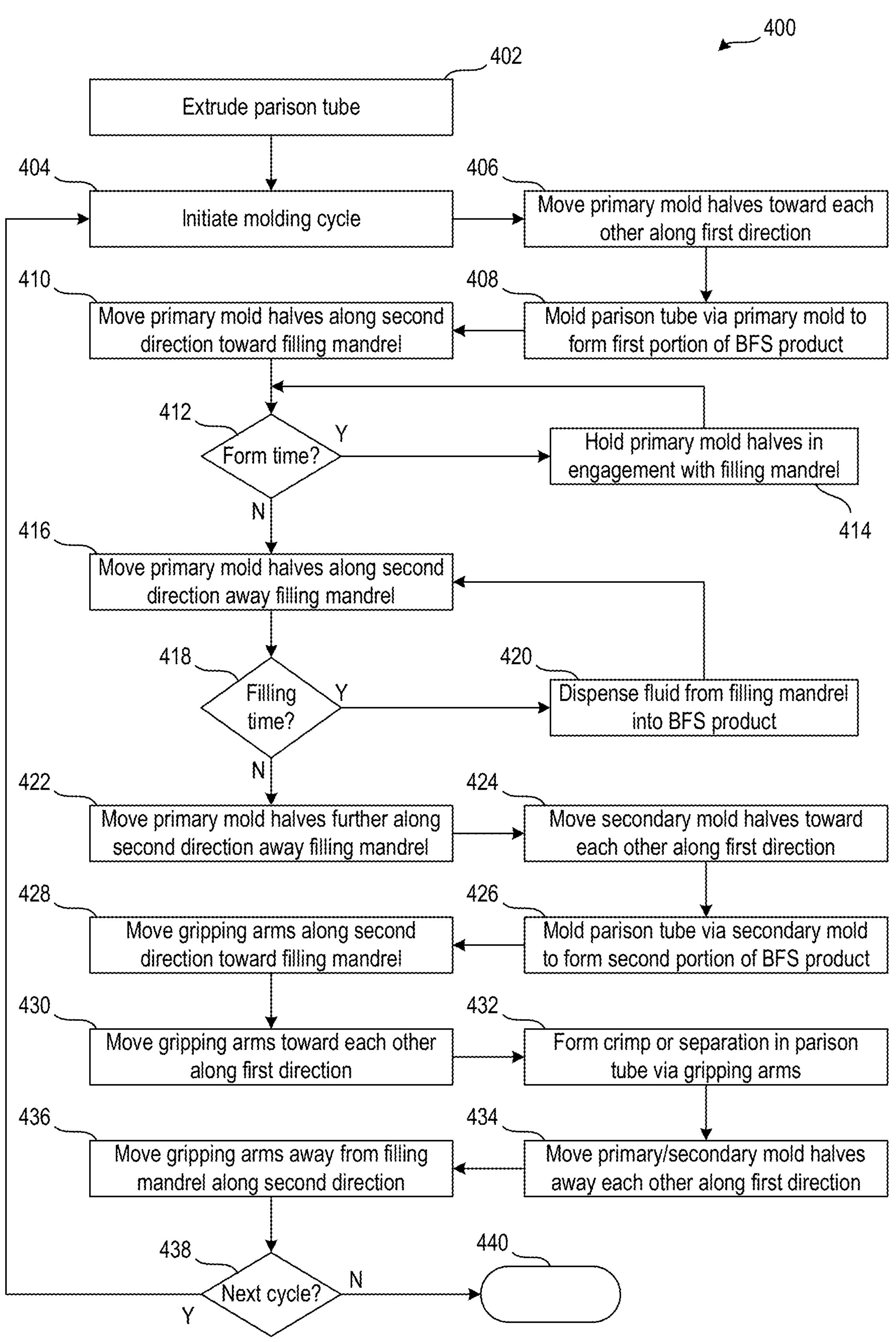
FIG. 4A is a process flow diagram of a method of operating a rotary BFS manufacturing system, according to one or more embodiments of the disclosed subject matter.

FIG. 4A shows an exemplary method 400 for operating a BFS manufacturing system, for example, the BFS manufacturing system 100 of FIG. 1 and/or the BFS manufacturing system 200 of FIGS. 2A-2C, 2F-2K. The method 400 can initiate at process block 402, where a parison tube is extruded. In some embodiments, the parison tube can be extruded by a parison system of the BFS manufacturing system. For example, in some embodiments, the parison tube can be extruded around one or more vertically-stationary filling mandrels (e.g., a filling mandrel array), such that a dispensing end of each filling mandrel is within an interior volume of the extruded parison tube. The method 400 can proceed to process block 404, where a molding cycle for a BFS product can be initiated. In some embodiments, the molding cycle can be initiated by moving components of the BFS manufacturing system into respective predetermined positions. For example, a primary mold and/or a secondary mold (e.g., each comprising a respective pair of mold halves) can move upward toward the filling mandrel so as to achieve their closest positions to the filling mandrel as compared to the rest of the molding cycle. Alternatively or additionally, a crimping device (e.g., comprising a pair of gripping arms) can move downward away from the filling mandrel, for example, so as to be disposed below the primary and secondary molds.

The method 400 can proceed to process block 406, where the mold halves of the primary mold can move along a first direction (e.g., substantially perpendicular to a direction of extrusion of the parison tube, such as substantially horizontal) toward each other, for example, to clamp a first portion of the parison tube therebetween. The method 400 can proceed to process block 408, where the primary mold is used to mold the first portion of the parison tube to form a respective first portion of one or more BFS products. For example, in some embodiments, the formed first portion can comprise at least one chamber. In some embodiments, the molding of process block 408 can employ blown air and/or vacuum to engage the parison with cavities of the primary mold halves. The method 400 can proceed to process block 410, where the mold halves of the primary mold (including the first portion of the parison tube therebetween) can be moved along a second direction (e.g., substantially parallel to a direction of extrusion of the parison tube, such as substantially vertical) toward the filling mandrel. In some embodiments, the moving of process block 410 can bring the first portion of the parison tube into engagement with the filling mandrel (e.g., disposed between and in contact with the first mold and the filling mandrel).

The method 400 can proceed to decision block 412, where it is determined if a predetermined forming time has been achieved. If the forming time has not yet been achieved, the method 400 can proceed to product block 414, where the engagement of the first portion of the parison tube with the filling mandrel can be maintained. In some embodiments, the position of the primary mold halves can be maintained (e.g., stationary in at least the second direction) throughout the forming time. For example, the forming time can be in a range of 0.2-0.5 seconds (e.g., about 0.3 seconds). In some embodiments, the engagement with the filling mandrel during the forming time can be effective to form a respective second portion (e.g., an internal surface feature) of the one or more BFS products, for example, a connection feature (e.g., a luer connection).

After the forming time, the method 400 can proceed from decision block 412 to process block 416, where the primary mold halves can be moved along the second direction away from the filling mandrel (e.g., downward). In some embodiments, the moving of process block 416 can disengage at least the second portion of the one or more BFS products from the filling mandrel. In some embodiments, during and/or after the moving of process block 416, a dispensing end of each filling mandrel can remain disposed within the one or more BFS products within the primary mold. The method 400 can proceed to decision block 418, where it is determined if filling should occur. If filling is desired (e.g., during a predetermined filling period), the method 400 can proceed to process block 420, where a fluid can be dispensed from the dispensing end of the respective filling mandrel so as to fill the one or more BFS products (e.g., a chamber thereof). In some embodiments, the filling can continue until a predetermined volume has been dispensed, for example, in a range of 0.5-5 mL per BFS product.

After sufficient fluid volume has been dispensed by the filling mandrel, the method 400 can proceed from decision block 418 to process block 422, where the primary mold halves can be further moved along the second direction away from the filling mandrel (e.g., downward). In some embodiments, the moving of process block 422 can be such that the dispensing end of each filling mandrel can be disposed outside of the one or more BFS products within the primary mold. The method 400 can proceed to process block 424, where the mold halves of a secondary mold can move along the first direction toward each other, for example, to clamp a second portion of the parison tube therebetween. The method 400 can proceed to process block 426, where the secondary mold is used to mold the second portion of the parison tube to form a respective third portion of the one or more BFS products. For example, in some embodiments, the formed third portion can comprise a seal. In some embodiments, the molding of process block 426 can employ blown air and/or vacuum to engage the parison with cavities of the secondary mold halves. In some embodiments, the moving along the second direction of process block 422 can overlap with the moving along the first direction of process block 424 and/or molding of process block 426, for example, such that the molds continue to move down as the molding is performed. Alternatively or additionally, in some embodiments, the primary and secondary molds can move together along the second direction, for example, with the secondary molds being disposed along the second direction closer to the filling mandrels than the primary molds.

The method 400 can proceed to process block 428, where gripping arms of a crimping device can be moved along the second direction toward the filling mandrel (e.g., upward). In some embodiments, once the gripping arms of the crimping device are between the secondary mold and the filling mandrel along the second direction, the method 400 can proceed to process block 430, where the gripping arms can be moved along the first direction toward each other (e.g., by rotating inward). The method 400 can proceed to process block 432, where the gripping arms can crimp a third portion of the parison tube disposed therebetween, for example, to form a crimp or separation defining a card or assembly containing the one or more BFS products. The method 400 can proceed to process block 434, where the mold halves of the primary and/or secondary mold can be moved along the first direction away from each other. For example, the opened primary and/or secondary molds can define a vertical gap between the respective mold halves, through which the extruded parison tube and/or formed BFS products can extend. The method 400 can proceed to process block 436, where the gripping arms can be moved along the second direction away from the filling mandrel, for example, in the vertical gap between the mold halves. In some embodiments, the moving of process block 436 can be such that the gripping arms are disposed on an opposite side of the primary and/or secondary molds from the filling mandrel along the second direction.

The method 400 can proceed to decision block 438, where it is determined if the molding cycle should be repeated, for example, to form a successive assembly of one or more BFS products from a further extruded portion of the parison tube. If a further cycle is desired, the method 400 can return to process block 404; otherwise, the method 400 can optionally terminate at terminal block 440 (e.g., to allow for maintenance or for any other reason).

Although some of blocks 402-440 of method 400 have been described as being performed once, in some embodiments, multiple repetitions of a particular process block may be employed before proceeding to the next decision block or process block. In addition, although blocks 402-440 of method 400 have been separately illustrated and described, in some embodiments, process blocks may be combined and performed together (simultaneously or sequentially) or performed in an overlapping manner (e.g., such that the parison tube extrusion of block 402 occurs during one or more of process blocks 404-438). Moreover, although FIG. 4A illustrates a particular order for blocks 402-440, embodiments of the disclosed subject matter are not limited thereto. Indeed, in certain embodiments, the blocks may occur in a different order than illustrated or simultaneously with other blocks.

VI. Computer Implementation

Figure 4B:
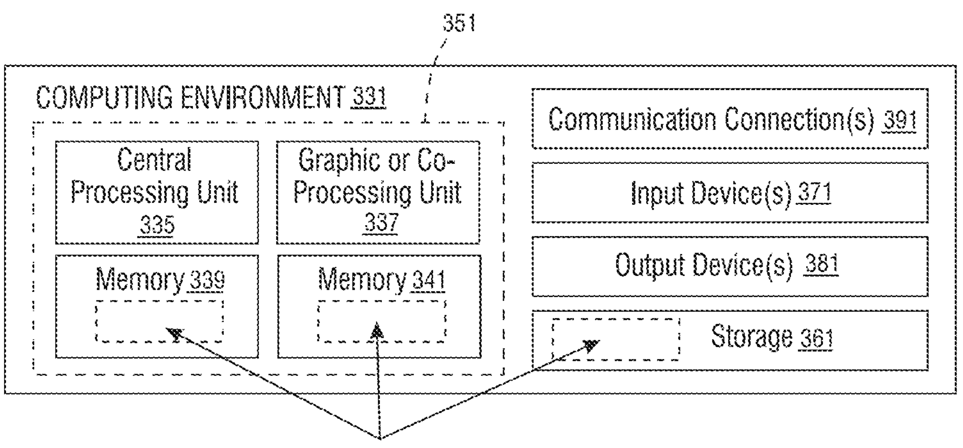
FIG. 4B depicts a generalized example of a computing environment in which the disclosed technologies may be implemented.

FIG. 4B depicts a generalized example of a suitable computing environment 331 in which the described innovations may be implemented, such as but not limited to aspects of controller 150, a control system for BFS manufacturing system according to any of FIGS. 2A-2K, a method for operating a BFS manufacturing system according to FIG. 4A, and/or a method for operating a BFS manufacturing system according to any of FIGS. 1-3B. The computing environment 331 is not intended to suggest any limitation as to scope of use or functionality, as the innovations may be implemented in diverse general-purpose or special-purpose computing systems. For example, the computing environment 331 can be any of a variety of computing devices (e.g., desktop computer, laptop computer, server computer, tablet computer, etc.).

With reference to FIG. 4B, the computing environment 331 includes one or more processing units 335, 337 and memory 339, 341. In FIG. 4B, this basic configuration 351 is included within a dashed line. The processing units 335, 337 execute computer-executable instructions. A processing unit can be a central processing unit (CPU), processor in an application-specific integrated circuit (ASIC), or any other type of processor (e.g., hardware processors, graphics processing units (GPUs), virtual processors, etc.). In a multi-processing system, multiple processing units execute computer-executable instructions to increase processing power. For example, FIG. 4B shows a central processing unit 335 as well as a graphics processing unit or co-processing unit 337. The tangible memory 339, 341 may be volatile memory (e.g., registers, cache, RAM), non-volatile memory (e.g., ROM, EEPROM, flash memory, etc.), or some combination of the two, accessible by the processing unit(s). The memory 339, 341 stores software 333 implementing one or more innovations described herein, in the form of computer-executable instructions suitable for execution by the processing unit(s).

A computing system may have additional features. For example, the computing environment 331 includes storage 361, one or more input devices 371, one or more output devices 381, and one or more communication connections 391. An interconnection mechanism (not shown) such as a bus, controller, or network interconnects the components of the computing environment 331. Typically, operating system software (not shown) provides an operating environment for other software executing in the computing environment 331, and coordinates activities of the components of the computing environment 331.

The tangible storage 361 may be removable or non-removable, and includes magnetic disks, magnetic tapes or cassettes, CD-ROMs, DVDs, or any other medium which can be used to store information in a non-transitory way, and which can be accessed within the computing environment 331. The storage 361 can store instructions for the software 333 implementing one or more innovations described herein.

The input device(s) 371 may be a touch input device such as a keyboard, mouse, pen, or trackball, a voice input device, a scanning device, or another device that provides input to the computing environment 331. The output device(s) 371 may be a display, printer, speaker, CD-writer, or another device that provides output from computing environment 331.

The communication connection(s) 391 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, radio-frequency (RF), or another carrier.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or any other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java™, Python®, and/or any other suitable computer language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. In any of the above-described examples and embodiments, provision of a request (e.g., data request), indication (e.g., data signal), instruction (e.g., control signal), or any other communication between systems, components, devices, etc. can be by generation and transmission of an appropriate electrical signal by wired or wireless connections.

VII. Additional Examples of the Disclosed Technology

In view of the above described implementations of the disclosed subject matter, this application discloses the additional examples in the clauses enumerated below. It should be noted that one feature of a clause in isolation, or more than one feature of the clause taken in combination, and, optionally, in combination with one or more features of one or more further clauses are further examples also falling within the disclosure of this application.

Clause 1. A rotary blow-fill-seal (BFS) manufacturing system, comprising:

a controller device;

a positioning system in communication with the controller device, the positioning system coupled to at least one two-part mold and operable to selectively alter at least a vertical position of the at least one two-part mold;

a parison head coupled to a supply of plastic resin and in communication with the controller device;

at least one fixed-position filling mandrel disposed within the parison head and in communication with the controller device; and one or more non-transitory computer readable storage media storing instructions that when executed by the controller device result in:

initiating a molding cycle by positioning, by the positioning system, the at least one two-part mold at a first vertical position that is a first vertical distance from a vertical datum;

causing, after the initiating and by the positioning system, and by positioning the at least one two-part mold at a second vertical position that is a second vertical distance from the vertical datum, the at least one two-part mold to engage with the fixed-position filling mandrel, thereby causing the fixed-position filling mandrel to form a portion of a BFS container;

molding the BFS container by closing the at least one two-part mold;

filling, by the fixed-position filling mandrel, the BFS container with a fluid product; and sealing the BFS container.

Clause 2. A rotary blow-fill-seal (BFS) manufacturing system, comprising:

a first mold comprising a first mold half and a second mold half;

a positioning system coupled to the first mold and constructed to move the first and second mold halves along a first direction toward or away from each other and along a second direction substantially perpendicular to the first direction;

at least one filling mandrel constructed to fill at least one BFS product molded by the rotary BFS manufacturing system with a fluid;

a parison system constructed to extrude a parison tube surrounding the at least one filling mandrel; and a controller operatively coupled to the positioning system, the at least one filling mandrel, and the parison system, the controller comprising one or more processors and one or more non-transitory computer readable storage media storing instructions that, when executed by the one or more processors, cause the controller to:

(a) move, via the positioning system, the first and second mold halves along the first direction toward each other and mold a first portion of the parison tube disposed therebetween to form a first portion of the at least one BFS product, the formed first portion of the at least one BFS product comprising at least one chamber;

(b) move, via the positioning system, the first and second mold halves along the second direction toward the at least one filling mandrel, such that part of the first portion of the parison tube is engaged between the first mold and the at least one filling mandrel so as to form a second portion of the at least one BFS product;

(c) move, via the positioning system, the first and second mold halves along the second direction away from the at least one filling mandrel, such that the second portion of the at least one BFS product disengages from the at least one filling mandrel and such that a dispensing end of the at least one filling mandrel remains disposed within the at least one BFS product within the first mold; and (d) dispense, via the at least one filling mandrel, a fluid from the dispensing end so as to fill the at least one BFS product, wherein a position of the dispensing end of the at least one filling mandrel along the second direction is the same throughout (a) through (d).

Clause 3. The rotary BFS manufacturing system of any clause or example herein, in particular, Clause 2, wherein the second portion of the at least one BFS product comprises a connection feature disposed proximal to an end of the at least one chamber.

Clause 4. The rotary BFS manufacturing system of any clause or example herein, in particular, Clause 3, wherein the connection feature comprises a Luer taper, one or more threads, or any combination of the foregoing.

Clause 5. The rotary BFS manufacturing system of any clause or example herein, in particular, any one of Clauses 2-4, wherein a volume of the fluid dispensed in (d) is in a range of 0.5 mL to 5 mL, inclusive.

Clause 6. The rotary BFS manufacturing system of any clause or example herein, in particular, any one of Clauses 2-5, wherein a volume of the fluid dispensed in (d) is 1 mL or less.

Clause 7. The rotary BFS manufacturing system of any clause or example herein, in particular, any one of Clauses 2-6, wherein the one or more non-transitory computer readable storage media store additional instructions that, when executed by the one or more processors, further cause the controller to, after (d):

(e) move, via the positioning system, the first and second mold halves along the second direction further away from the at least one filling mandrel, such that the dispensing end of the at least one filling mandrel is disposed outside of the at least one BFS product within the first mold.

Clause 8. The rotary BFS manufacturing system of any clause or example herein, in particular, Clause 7, wherein during (c) and/or (d), the first and second mold halves are moved along the second direction at a first velocity, and during (e), the first and second mold halves are moved along the second direction at a second velocity greater than the first velocity.

Clause 9. The rotary BFS manufacturing system of any clause or example herein, in particular, any one of Clauses 7-8, wherein a velocity of the first and second mold halves along the second direction during at least one of (a), (b), (c), (d), and (e) is different from a velocity of the first and second mold halves along the second direction during another of (a), (b), (c), (d), and (e).

Clause 10. The rotary BFS manufacturing system of any clause or example herein, in particular, any one of Clauses 2-9, wherein a length of the at least one filling mandrel along the second direction is less than or equal to 30 mm.

Clause 11. The rotary BFS manufacturing system of any clause or example herein, in particular, any one of Clauses 2-10, wherein:

a duration of the dispensing of (d) is less than or equal to 12.5% of a duration of an entire molding cycle of the rotary BFS manufacturing system;

a duration of the dispensing of (d) is less than or equal to 1 second; or both of the above.

Clause 12. The rotary BFS manufacturing system of any clause or example herein, in particular, any one of Clauses 2-9, wherein a length of the at least one filling mandrel along the second direction is in a range of 40-65 mm.

Clause 13. The rotary BFS manufacturing system of any clause or example herein, in particular, Clause 12, wherein:

a duration of the dispensing of (d) is greater than or equal to 20% of a duration of an entire molding cycle of the rotary BFS manufacturing system;

a duration of the dispensing of (d) is greater than or equal to 1.5 seconds; or both of the above.

Clause 14. The rotary BFS manufacturing system of any clause or example herein, in particular, any one of Clauses 2-13, further comprising:

a second mold comprising a third mold half and a fourth mold half, wherein the positioning system is further coupled to the second mold and constructed to move the third and fourth mold halves along the first direction toward or away from each other and along the second direction, and the one or more non-transitory computer readable storage media store additional instructions that, when executed by the one or more processors, further cause the controller to, after (e):

(f) move, via the positioning system, the third and fourth mold halves along the first direction toward each other and mold a second portion of the parison tube disposed therebetween to form a third portion of the at least one BFS product.

Clause 15. The rotary BFS manufacturing system of any clause or example herein, in particular, Clause 14, wherein the third portion of the at least one BFS product comprises a seal.

Clause 16. The rotary BFS manufacturing system of any clause or example herein, in particular, any one of Clauses 14-15, further comprising:

a crimping truck comprising first and second gripping arms, wherein the positioning system is further coupled to the crimping truck and constructed to move the first and second gripping arms along the first direction toward or away from each other and along the second direction, and the one or more non-transitory computer readable storage media store additional instructions that, when executed by the one or more processors, further cause the controller to, after (f):

(g) move, via the positioning system, the first and second gripping arms along the first direction toward each other, so as to crimp a third portion of the parison tube disposed therebetween to form a crimp or separation defining a card or assembly containing the at least one BFS product.

Clause 17. The rotary BFS manufacturing system of any clause or example herein, in particular, any one of Clauses 14-16, wherein:

after the moving of (a) and prior to the moving of (b), the first mold is at a first distance along the second direction from a predetermined fixed reference point;

after the moving of (b) and prior to the moving of (c), the first mold is at a second distance along the second direction from the predetermined fixed reference point, the second distance being less than the first distance;

after the moving of (c) and prior to the moving of (e), the first mold is at a third distance along the second direction from the predetermined fixed reference point, the third distance being greater than the second distance;

after the moving of (e) and prior to the moving of (f), the first mold is at a fourth distance along the second direction from the predetermined fixed reference point, the fourth distance being greater than the third distance; and the predetermined fixed reference point is based on a part of the parison system, the at least one filling mandrel, or both.

Clause 18. The rotary BFS manufacturing system of any clause or example herein, in particular, Clause 17, wherein a difference between the second distance and the first distance is less than or equal to 3 mm.

Clause 19. The rotary BFS manufacturing system of any clause or example herein, in particular, any one of Clauses 17-18, wherein:

after the moving of (f) and prior to the moving of (g), the first mold is at a fifth distance along the second direction from the predetermined fixed reference point, the fifth distance being greater than the fourth distance; and/or after the moving of (g), the first mold is at a maximum distance along the second direction from the predetermined fixed reference point, the maximum distance being greater than the fifth distance.

Clause 20. The rotary BFS manufacturing system of any clause or example herein, in particular, any Clause 19, wherein the maximum distance is less than or equal to 140 mm.

Clause 21. The rotary BFS manufacturing system of any clause or example herein, in particular, any one of Clauses 19-20, wherein a difference between the second distance and the first distance is less than or equal to 2.5% of the maximum distance.

Clause 22. The rotary BFS manufacturing system of any clause or example herein, in particular, any one of Clauses 14-21, wherein:

the first mold half has a first mold pattern, the second mold half has a second mold pattern, and the first mold pattern is a mirror image of the second mold pattern;

the third mold half has a third mold pattern, the fourth mold half has a fourth mold pattern, and the third mold pattern is a mirror image of the fourth mold pattern; or any combination of the above.

Clause 23. The rotary BFS manufacturing system of any clause or example herein, in particular, any one of Clauses 2-22, wherein the one or more non-transitory computer readable storage media store additional instructions that, when executed by the one or more processors, further cause the controller to, after (b) and before (c), maintain, via the positioning system, a position of the first and second mold halves along the second direction with the part of the first portion of the parison tube engaged between the first mold and the at least one filling mandrel for a first time period.

Clause 24. The rotary BFS manufacturing system of any clause or example herein, in particular, Clause 23, wherein the first time period is less than or equal to 5% of a duration of an entire molding cycle of the rotary BFS manufacturing system.

Clause 25. The rotary BFS manufacturing system of any clause or example herein, in particular, Clause 24, wherein the duration of the entire molding cycle is in a range of 3 seconds to 8 seconds, inclusive.

Clause 26. The rotary BFS manufacturing system of any clause or example herein, in particular, any one of Clauses 23-25, wherein the first time period is in a range of 0.2 seconds to 0.5 seconds, inclusive.

Clause 27. The rotary BFS manufacturing system of any clause or example herein, in particular, any one of Clauses 23-26, wherein the one or more non-transitory computer readable storage media store additional instructions that, when executed by the one or more processors, further cause the controller to, while maintaining the position of the first and second mold halves along the second direction, continue to dispense, via the parison system, the parison tube in a continuous stream along the second direction toward the first mold.

Clause 28. The rotary BFS manufacturing system of any clause or example herein, in particular, any one of Clauses 1-27, wherein the parison tube or the plastic resin comprises polyethylene or polypropylene.

Clause 29. The rotary BFS manufacturing system of any clause or example herein, in particular, any one of Clauses 1-28, wherein the fluid or fluid product comprises a medicament.

Clause 30. The rotary BFS manufacturing system of any clause or example herein, in particular, any one of Clauses 1-29, wherein the at least one filling mandrel comprises a fixed array of at least twenty-five filling mandrels.

Clause 31. The rotary BFS manufacturing system of any clause or example herein, in particular, any one of Clauses 2-30, wherein the first direction is substantially horizontal and the second direction is substantially vertical.

Clause 32. The rotary BFS manufacturing system of any clause or example herein, in particular, any one of Clauses 1-31, wherein the rotary BFS manufacturing system is configured as a hybrid rotary BFS machine.

Clause 33. A method comprising:

(a) moving first and second mold halves of a first mold along a first direction toward each other with a first portion of a parison tube therebetween;

(b) molding, via the first and second mold halves, the first portion of the parison tube so as to form a first portion of at least one BFS product, the formed first portion of the at least one BFS product comprising at least one chamber;

(c) moving the first and second mold halves along a second direction toward at least one filling mandrel such that part of the first portion of the parison tube is engaged between the first mold and the at least one filling mandrel so as to form a second portion of the at least one BFS product, the second direction being substantially perpendicular to the first direction;

(d) moving the first and second mold halves along the second direction away from the at least one filling mandrel such that the second portion of the least one BFS product disengages from the at least one filling mandrel and such that a dispensing end of the at least one filling mandrel remains disposed within the at least one BFS product within the first mold; and (e) dispensing a fluid from the dispensing end of the at least one filling mandrel so as to fill the at least one BFS product, wherein a position of the dispensing end of the at least one filling mandrel along the second direction remains the same throughout (a) through (e).

Clause 34. The method of any clause or example herein, in particular, Clause 33, wherein the second portion of the at least one BFS product comprises a connection feature disposed proximal to an end of the at least one chamber.

Clause 35. The method of any clause or example herein, in particular, any one of Clauses 33-34, wherein the second portion of the at least one BFS product comprises a Luer taper, one or more threads, or any combination of the foregoing.

Clause 36. The method of any clause or example herein, in particular, any one of Clauses 33-35, wherein the at least one BFS product comprises an array of at least five BFS vials.

Clause 37. The method of any clause or example herein, in particular, any one of Clauses 33-36, wherein a volume of the fluid dispensed in (e) is in a range of 0.5 mL to 5 mL, inclusive.

Clause 38. The method of any clause or example herein, in particular, any one of Clauses 33-37, wherein a volume of the fluid dispensed in (e) is 1 mL or less.

Clause 39. The method of any clause or example herein, in particular, any one of Clauses 33-38, further comprising, after (e):

(f) moving the first and second mold halves along the second direction further away from the at least one filling mandrel, such that the dispensing end of the at least one filling mandrel is disposed outside of the at least one BFS product within the first mold.

Clause 40. The method of any clause or example herein, in particular, Clause 39, wherein during (d) and/or (e), the first and second mold halves are moved along the second direction at a first velocity, and during (f), the first and second mold halves are moved along the second direction at a second velocity greater than the first velocity.

Clause 41. The method of any clause or example herein, in particular, any one of Clauses 38-39, wherein a velocity of the first and second mold halves along the second direction during at least one of (a), (b), (c), (d), (e), and (f) is different from a velocity of the first and second mold halves along the second direction during another of (a), (b), (c), (d), (e), and (f).

Clause 42. The method of any clause or example herein, in particular, any one of Clauses 33-41, wherein a duration of the dispensing of (e) is less than or equal to 12.5% of a duration of an entire molding cycle, and/or a duration of the dispensing of (e) is less than or equal to 1 second.

Clause 43. The method of any clause or example, herein, in particular, any one of Clauses 33-41, wherein a duration of the dispensing of (e) is greater than or equal to 20% of a duration of an entire molding cycle of the rotary BFS manufacturing system, and/or a duration of the dispensing of (d) is greater than or equal to 1.5 seconds.

Clause 44. The method of any clause or example herein, in particular, any one of Clauses 33-43, further comprising, after (e):

(g) moving third and fourth mold halves of a second mold along the first direction toward each other with a second portion of the parison tube therebetween; and (h) molding, via the third and fourth mold halves, the second portion of the parison tube so as to form a third portion of the at least one BFS product.

Clause 45. The method of any clause or example herein, in particular, Clause 44, wherein the third portion of the at least one BFS product comprises a seal.

Clause 46. The method of any clause or example herein, in particular, any one of Clauses 33-45, further comprising, after (e):

(i) moving first and second gripping arms of a crimping truck along the first direction toward each other with a third portion of the parison tube therebetween; and (j) forming, via the first and second gripping arms, a crimp or separation that defines a card or assembly containing the at least one BFS product.

Clause 47. The method of any clause or example herein, in particular, any one of Clauses 33-46, wherein:

after the moving of (a) and prior to the moving of (c), the first mold is at a first distance along the second direction from a predetermined fixed reference point;

after the moving of (c) and prior to the moving of (d), the first mold is at a second distance along the second direction from the predetermined fixed reference point, the second distance being less than the first distance;

after the moving of (d) and prior to the moving of (f), the first mold is at a third distance along the second direction from the predetermined fixed reference point, the third distance being greater than the second distance;

after the moving of (f) and prior to the moving of (g), the first mold is at a fourth distance along the second direction from the predetermined fixed reference point, the fourth distance being greater than the third distance; and/or the predetermined fixed reference point is based on a part of a parison system, the at least one filling mandrel, or both.

Clause 48. The method of any clause or example herein, in particular, Clause 47, wherein a difference between the second distance and the first distance is less than or equal to 3 mm.

Clause 49. The method of any clause or example herein, in particular, any one of Clauses 47-48, wherein:

after the moving of (g) and prior to the moving of (i), the first mold is at a fifth distance along the second direction from the predetermined fixed reference point, the fifth distance being greater than the fourth distance; and/or after the moving of (i), the first mold is at a maximum distance along the second direction from the predetermined fixed reference point, the maximum distance being greater than the fifth distance.

Clause 50. The method of any clause or example herein, in particular, Clause 49, wherein the maximum distance is less than or equal to 140 mm.

Clause 51. The method of any clause or example herein, in particular, any one of Clauses 49-50, wherein a difference between the second distance and the first distance is less than or equal to 2.5% of the maximum distance.

Clause 52. The method of any clause or example herein, in particular, any one of Clauses 33-51, further comprising, after (c) and before (d), maintaining a position of the first and second mold halves along the second direction with the part of the first portion of the parison tube engaged between the first mold and the at least one filling mandrel for a first time period.

Clause 53. The method of any clause or example herein, in particular, Clause 52, wherein the first time period is less than or equal to 5% of a duration of an entire molding cycle of a rotary BFS manufacturing system.

Clause 54. The method of any clause or example herein, in particular, Clause 53, wherein the duration of the entire molding cycle is in a range of 3 seconds to 8 seconds, inclusive.

Clause 55. The method of any clause or example herein, in particular, any one of Clauses 52-54, wherein the first time period is in a range of 0.2 seconds to 0.5 seconds, inclusive.

Clause 56. The method of any clause or example herein, in particular, any one of Clauses 33-55, wherein the parison tube comprises polyethylene or polypropylene.

Clause 57. The method of any clause or example herein, in particular, any one of Clauses 33-56, wherein the fluid comprises a medicament.

Clause 58. The method of any clause or example herein, in particular, any one of Clauses 33-57, wherein the at least one filling mandrel comprises a fixed array of at least twenty-five filling mandrels.

Clause 59. The method of any clause or example herein, in particular, any one of Clauses 33-58, wherein the first direction is substantially horizontal and the second direction is substantially vertical.

Clause 60. The method of any clause or example herein, in particular, any one of Clauses 33-59, further comprising, after (e):

moving the first and second mold halves along the first direction away from each other;

moving the first and second mold halves along the second direction toward the at least one filling mandrel; and repeating (a) through (e) for a subsequent first portion of the parison tube extruded from a parison system.

Clause 61. A BFS assembly formed by the method of any clause or example herein, in particular, any one of Clauses 33-60.

Clause 62. The BFS assembly of any clause or example herein, in particular, Clause 61, comprising a plurality of BFS products with fluid respectively sealed therein.

Clause 63. A non-transitory computer-readable memory storing instructions configured so that, when executed by a processor, the instructions cause a BFS manufacturing system to perform the method of any clause or example herein, in particular, any one of Clauses 33-60.

VIII. Rules of Interpretation

Any or all of the BFS products disclosed herein can be formed of one or more plastics. In some embodiments, some components (e.g., the BFS vials) can be formed of a relatively soft polymer (e.g., having a Shore/Durometer "D" hardness of between 60 and 70), such as polyethylene (e.g., low density polyethylene (LDPE)), polypropylene, or any other polymer adaptable for use in a BFS manufacturing process. In some embodiments, some components (e.g., the connection assemblies, the administration assemblies, and/or needle caps or covers) can be formed, at least in part, of a relatively hard polymer (e.g., having a hardness greater than 80 on the Rockwell "R" scale), such as, but not limited to, polypropylene, polycarbonate, polybenzimidazole, acrylonitrile butadiene styrene (ABS), polystyrene, polyvinyl chloride, or the like. Other materials are also possible according to one or more contemplated embodiments. Any or all of the BFS molding machine components disclosed herein, for example, each BFS mold half can be formed of one or more metals. In some embodiments, each BFS mold half can comprise steel. Other materials are also possible according to one or more contemplated embodiments.

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments. A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required. Although a product may be described as including a plurality of components, aspects, qualities, characteristics and/or features, that does not indicate that all of the plurality are essential or required. Various other embodiments within the scope of the described invention(s) include other products that omit some or all of the described plurality. A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Neither the Title (set forth at the beginning of the first page of this patent application) nor the Abstract (set forth at the end of this patent application) is to be taken as limiting in any way as the scope of the disclosed invention(s). Headings of sections provided in this patent application are for convenience only, and are not to be taken as limiting the disclosure in any way.

All definitions, as defined and used herein, should be understood to control over dictionary definitions, definitions in documents incorporated by reference, and/or ordinary meanings of the defined terms. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise. Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A reference to "another embodiment" in describing an embodiment does not imply that the referenced embodiment is mutually exclusive with another embodiment (e.g., an embodiment described before the referenced embodiment), unless expressly specified otherwise.

The indefinite articles "a" and "an," as used herein in the specification and in the claims, unless clearly indicated to the contrary, should be understood to mean "at least one" or "one or more".

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods, as known to those of ordinary skill in the art. When directly and explicitly distinguishing embodiments from discussed prior art, the embodiment numbers are not approximates unless the word "about" is recited. Whenever "substantially," "approximately," "about," or similar language is explicitly used in combination with a specific value, variations up to and including ten percent (10%) of that value are intended, unless explicitly stated otherwise.

Directions and other relative references may be used to facilitate discussion of the drawings and principles herein, but are not intended to be limiting. For example, certain terms may be used such as "inner," "outer", "upper," "lower," "top," "bottom," "interior," "exterior," "left," right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same. Similarly, while the terms "horizontal" and "vertical" may be utilized herein, such terms may refer to any normal geometric planes regardless of their orientation with respect to true horizontal or vertical directions (e.g., with respect to the vector of gravitational acceleration).

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices which are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

"Determining" something can be performed in a variety of manners and therefore the term "determining" (and like terms) includes calculating, computing, deriving, looking up (e.g., in a table, database or data structure), ascertaining and the like The terms "including", "comprising" and variations thereof mean "including but not limited to", unless expressly specified otherwise. As used herein, "comprising" means "including," and the singular forms "a" or "an" or "the" include plural references unless the context clearly dictates otherwise. The term "or" refers to a single element of stated alternative elements or a combination of two or more elements, unless the context clearly indicates otherwise

IX. Conclusion

Any of the features illustrated or described with respect to FIGS. 1-4B and Clauses 1-63 can be combined with any other features illustrated or described with respect to FIGS. 1-4B and Clauses 1-63 to provide systems, assemblies, kits, devices, methods, and embodiments not otherwise illustrated or specifically described herein. All features described herein are independent of one another and, except where structurally impossible, can be used in combination with any other feature described herein.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

Various modifications of the invention and many further embodiments thereof, in addition to those shown and described herein, will become apparent to those skilled in the art from the full contents of this document, including references to any scientific and patent literature cited herein. The subject matter herein contains important information, exemplification and guidance that can be adapted to the practice of this invention in its various embodiments and equivalents thereof. It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. A rotary blow-fill-seal (BFS) manufacturing system, comprising:

a first mold comprising a first mold half and a second mold half;

a positioning system coupled to the first mold and constructed to move the first and second mold halves along a first direction toward or away from each other and along a second direction substantially perpendicular to the first direction;

at least one filling mandrel constructed to fill at least one BFS product molded by the rotary BFS manufacturing system with a fluid;

a parison system constructed to extrude a parison tube surrounding the at least one filling mandrel; and a controller operatively coupled to the positioning system, the at least one filling mandrel, and the parison system, the controller comprising one or more processors and one or more non-transitory computer readable storage media storing instructions that, when executed by the one or more processors, cause the controller to:

(a) move, via the positioning system, the first and second mold halves along the first direction toward each other and mold a first portion of the parison tube disposed therebetween to form a first portion of the at least one BFS product, the formed first portion of the at least one BFS product comprising at least one chamber;

(b) move, via the positioning system, the first and second mold halves along the second direction toward the at least one filling mandrel, such that part of the first portion of the parison tube is engaged between the first mold and the at least one filling mandrel so as to form a second portion of the at least one BFS product;

(c) move, via the positioning system, the first and second mold halves along the second direction away from the at least one filling mandrel, such that the second portion of the at least one BFS product disengages from the at least one filling mandrel and such that a dispensing end of the at least one filling mandrel remains disposed within the at least one BFS product within the first mold; and (d) dispense, via the at least one filling mandrel, a fluid from the dispensing end so as to fill the at least one BFS product, wherein a position of the dispensing end of the at least one filling mandrel along the second direction is the same throughout (a) through (d).

2. The rotary BFS manufacturing system of claim 1, wherein the second portion of the at least one BFS product comprises a connection feature disposed proximal to an end of the at least one chamber.

3. The rotary BFS manufacturing system of claim 2, wherein the connection feature comprises a luer taper, one or more threads, or any combination of the foregoing.

4. The rotary BFS manufacturing system of claim 1, wherein a volume of the fluid dispensed in (d) is in a range of 0.5 mL to 5 mL, inclusive.

5. The rotary BFS manufacturing system of claim 1, wherein the one or more non-transitory computer readable storage media store additional instructions that, when executed by the one or more processors, further cause the controller to, after (d):

(e) move, via the positioning system, the first and second mold halves along the second direction further away from the at least one filling mandrel, such that the dispensing end of the at least one filling mandrel is disposed outside of the at least one BFS product within the first mold.

6. The rotary BFS manufacturing system of claim 5, wherein:

during (c) and/or (d), the first and second mold halves are moved along the second direction at a first velocity; and during (e), the first and second mold halves are moved along the second direction at a second velocity greater than the first velocity.

7. The rotary BFS manufacturing system of claim 5, wherein a velocity of the first and second mold halves along the second direction during at least one of (a), (b), (c), (d), and (e) is different from a velocity of the first and second mold halves along the second direction during another of (a), (b), (c), (d), and (e).

8. The rotary BFS manufacturing system of claim 5, wherein a length of the at least one filling mandrel along the second direction is less than or equal to 30 mm.

9. The rotary BFS manufacturing system of claim 8, wherein:

a duration of the dispensing of (d) is less than or equal to 12.5% of a duration of an entire molding cycle of the rotary BFS manufacturing system;

a duration of the dispensing of (d) is less than or equal to 1 second; or both of the above.

10. The rotary BFS manufacturing system of claim 5, wherein a length of the at least one filling mandrel along the second direction is in a range of 40-65 mm.

11. The rotary BFS manufacturing system of claim 10, wherein:

a duration of the dispensing of (d) is greater than or equal to 20% of a duration of an entire molding cycle of the rotary BFS manufacturing system;

a duration of the dispensing of (d) is greater than or equal to 1.5 seconds; or both of the above.

12. The rotary BFS manufacturing system of claim 5, further comprising:

a second mold comprising a third mold half and a fourth mold half, wherein the positioning system is further coupled to the second mold and constructed to move the third and fourth mold halves along the first direction toward or away from each other and along the second direction, and the one or more non-transitory computer readable storage media store additional instructions that, when executed by the one or more processors, further cause the controller to, after (e):

(f) move, via the positioning system, the third and fourth mold halves along the first direction toward each other and mold a second portion of the parison tube disposed therebetween to form a third portion of the at least one BFS product.

13. The rotary BFS manufacturing system of claim 12, wherein the third portion of the at least one BFS product comprises a seal.

14. The rotary BFS manufacturing system of claim 12, further comprising:

a crimping truck comprising first and second gripping arms, wherein the positioning system is further coupled to the crimping truck and constructed to move the first and second gripping arms along the first direction toward or away from each other and along the second direction, and the one or more non-transitory computer readable storage media store additional instructions that, when executed by the one or more processors, further cause the controller to, after (f):

(g) move, via the positioning system, the first and second gripping arms along the first direction toward each other, so as to crimp a third portion of the parison tube disposed therebetween to form a crimp or separation defining a card or assembly containing the at least one BFS product.

15. The rotary BFS manufacturing system of claim 14, wherein:

after the moving of (a) and prior to the moving of (b), the first mold is at a first distance along the second direction from a predetermined fixed reference point;

after the moving of (b) and prior to the moving of (c), the first mold is at a second distance along the second direction from the predetermined fixed reference point, the second distance being less than the first distance;

after the moving of (c) and prior to the moving of (e), the first mold is at a third distance along the second direction from the predetermined fixed reference point, the third distance being greater than the second distance;

after the moving of (e) and prior to the moving of (f), the first mold is at a fourth distance along the second direction from the predetermined fixed reference point, the fourth distance being greater than the third distance; and the predetermined fixed reference point is based on a part of the parison system, the at least one filling mandrel, or both.

16. The rotary BFS manufacturing system of claim 15, wherein a difference between the second distance and the first distance is less than or equal to 3 mm.

17. The rotary BFS manufacturing system of claim 15, wherein:

after the moving of (f) and prior to the moving of (g), the first mold is at a fifth distance along the second direction from the predetermined fixed reference point, the fifth distance being greater than the fourth distance; and after the moving of (g), the first mold is at a maximum distance along the second direction from the predetermined fixed reference point, the maximum distance being greater than the fifth distance.

18. The rotary BFS manufacturing system of claim 17, wherein the maximum distance is less than or equal to 140 mm.

19. The rotary BFS manufacturing system of claim 17, wherein a difference between the second distance and the first distance is less than or equal to 2.5% of the maximum distance.

20. The rotary BFS manufacturing system of claim 12, wherein:

the first mold half has a first mold pattern, the second mold half has a second mold pattern, and the first mold pattern is a mirror image of the second mold pattern;

the third mold half has a third mold pattern, the fourth mold half has a fourth mold pattern, and the third mold pattern is a mirror image of the fourth mold pattern; or any combination of the above.

21. The rotary BFS manufacturing system of claim 1, wherein the one or more non-transitory computer readable storage media store additional instructions that, when executed by the one or more processors, further cause the controller to, after (b) and before (c):

maintain, via the positioning system, a position of the first and second mold halves along the second direction with the part of the first portion of the parison tube engaged between the first mold and the at least one filling mandrel for a first time period.

22. The rotary BFS manufacturing system of claim 21, wherein the first time period is less than or equal to 5% of a duration of an entire molding cycle of the rotary BFS manufacturing system.

23. The rotary BFS manufacturing system of claim 22, wherein the duration of the entire molding cycle is in a range of 3 seconds to 8 seconds, inclusive.

24. The rotary BFS manufacturing system of claim 21, wherein the first time period is in a range of 0.2 seconds to 0.5 seconds, inclusive.

25. The rotary BFS manufacturing system of claim 21, wherein the one or more non-transitory computer readable storage media store additional instructions that, when executed by the one or more processors, further cause the controller to, while maintaining the position of the first and second mold halves along the second direction:

continue to dispense, via the parison system, the parison tube in a continuous stream along the second direction toward the first mold.

26. The rotary BFS manufacturing system of claim 1, wherein the parison tube comprises polyethylene or polypropylene.

27. The rotary BFS manufacturing system of claim 1, wherein the fluid comprises a medicament.

28. The rotary BFS manufacturing system of claim 1, wherein the at least one filling mandrel comprises a fixed array of at least twenty-five filling mandrels.

29. The rotary BFS manufacturing system of claim 1, wherein the first direction is substantially horizontal and the second direction is substantially vertical.

30. The rotary BFS manufacturing system of claim 1, wherein the rotary BFS manufacturing system is configured as a hybrid rotary BFS machine.

31. A method comprising:

(a) moving first and second mold halves of a first mold along a first direction toward each other with a first portion of a parison tube therebetween;

(b) molding, via the first and second mold halves, the first portion of the parison tube so as to form a first portion of at least one BFS product, the formed first portion of the at least one BFS product comprising at least one chamber;

(c) moving the first and second mold halves along a second direction toward at least one filling mandrel such that part of the first portion of the parison tube is engaged between the first mold and the at least one filling mandrel so as to form a second portion of the at least one BFS product, the second direction being substantially perpendicular to the first direction;

(d) moving the first and second mold halves along the second direction away from the at least one filling mandrel such that the second portion of the least one BFS product disengages from the at least one filling mandrel and such that a dispensing end of the at least one filling mandrel remains disposed within the at least one BFS product within the first mold; and (e) dispensing a fluid from the dispensing end of the at least one filling mandrel so as to fill the at least one BFS product, wherein a position of the dispensing end of the at least one filling mandrel along the second direction remains the same throughout (a) through (e).

* * * * *